Figure 1:
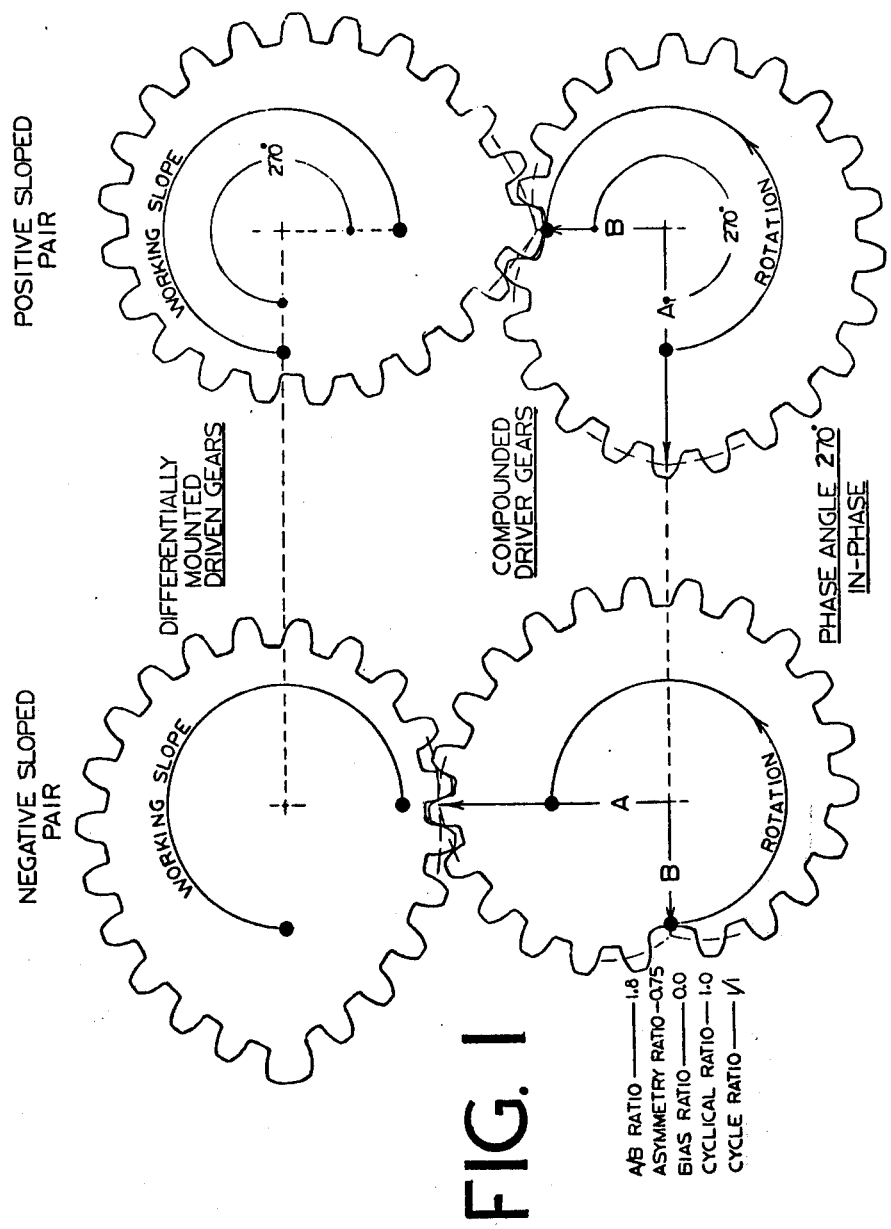

United States Patent [19]

Kerr

[11] 4,055,091
[45] Oct. 25, 1977

[54] VARIABLE OUTPUT TRANSMISSION

[75] Inventor: John Hugh Kerr, Kitchener, Canada

[73] Assignee: Ker-Train Systems N.V., Curacad, Netherlands Antilles

[21] Appl. No.: 634,683

[22] Filed: Nov. 24, 1975

Related U.S. Application Data

[62] Division of Ser. No. 390,454, Aug. 22, 1973, abandoned.

[30] Foreign Application Priority Data

Aug. 31, 1972 Canada .................................. 150683

[51] Int. Cl.² ...................... F16H 35/02; F16H 37/06; F16H 1/38
[52] U.S. Cl. ........................................ 74/394; 74/674; 74/681; 74/710
[58] Field of Search ............ 74/681, 679, 665 P, 74/437, 394, 393, 392, 650, 674, 701, 705, 710, 714, 394, 395, 434, 437, 462, 797, 800, 804, 243 PC

[56] References Cited

U.S. PATENT DOCUMENTS

| | | | |
|---|---|---|---|
| 1,190,407 | 7/1916 | Helmbold et al. | 74/394 |
| 1,409,900 | 3/1922 | Adams, Jr. | 74/394 |
| 2,143,236 | 1/1939 | Birk | 74/437 X |
| 2,552,572 | 5/1951 | Mikina | 74/437 X |
| 3,204,330 | 9/1965 | Pomernacki | 74/394 X |
| 3,424,021 | 1/1969 | Freudenstein | 74/394 |
| 3,473,414 | 10/1969 | Shachter | 74/437 X |
| 3,656,363 | 4/1972 | Defontenay | 74/394 |
| 3,812,734 | 5/1974 | Hamburger | 74/243 PC |

FOREIGN PATENT DOCUMENTS 1,129,029 5/1962 Germany .................................. 74/394

OTHER PUBLICATIONS

"When You Need Noncircular Gears", B. Bloomfield, Product Engineering, Mar. 14, 1960, pp. 59–66.
"Designing and Using Noncircular Gears to Generate Mathematical Functions," F. W. Cunningham, based on paper presented at the Fifth Conference on Mechanisms, cosponsored by Purdue Univ. & Machine Design, Oct. 13–14, 1958.

Primary Examiner—Samuel Scott
Assistant Examiner—Lance W. Chandler
Attorney, Agent, or Firm—H. Wayne Rock

[57] ABSTRACT

The present invention relates to variable output transmissions which utilize mechanical square wave generators. The square wave generator comprises a plurality of relatively rotatable driver gears mounted on a first common shaft, and a plurality of driven gears mounted to the bevel gears of a differential, the differential carrier and pinion thereof being fixedly mounted on a second common shaft. The driven and driver gear meshingly engage, the rotation of the driver gears imparting a relative pattern of rotation to the driven gears to cause the differential carrier and the second shaft to rotate with an angular velocity determined by the relative angle of mounting the driver gears. The output angular velocity of the generators is applied to the output shaft of the transmission such that by varying the relative angle of mounting the driver gears the output of the transmission may be varied.

3 Claims, 76 Drawing Figures

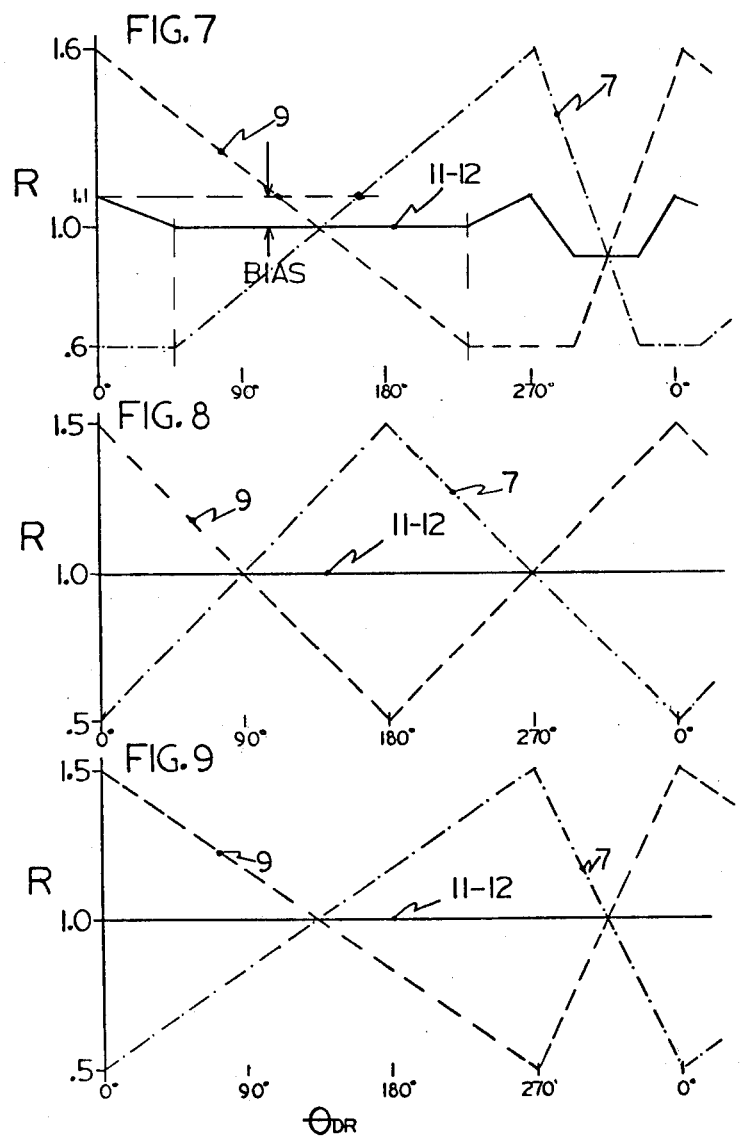

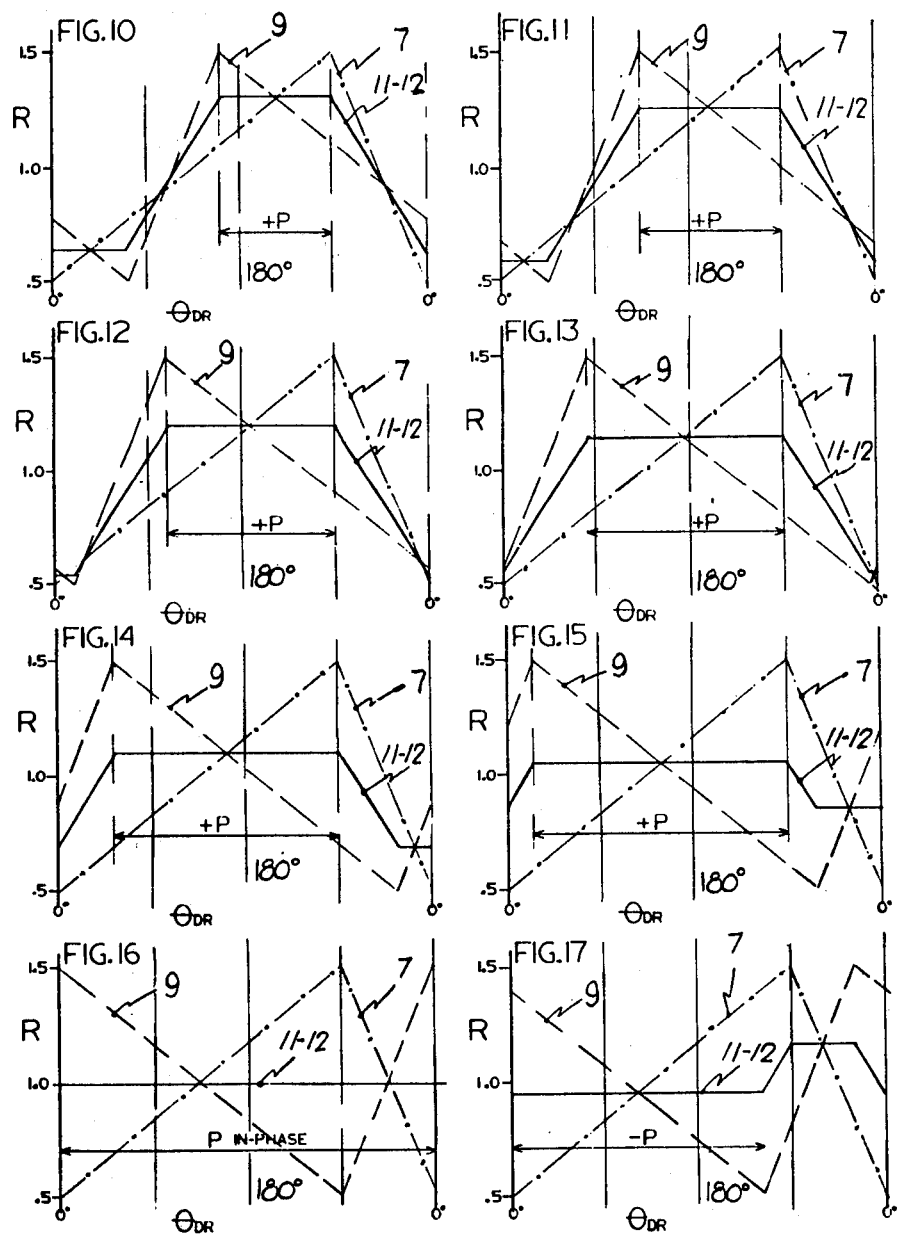

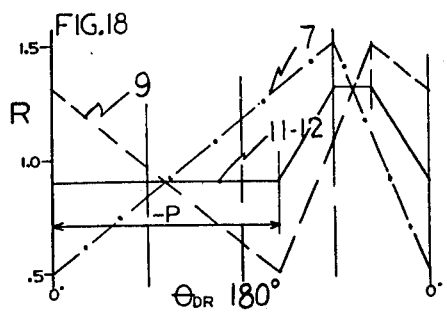
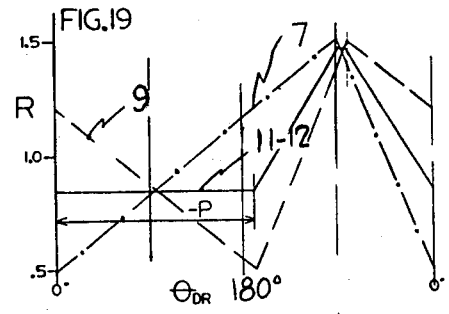
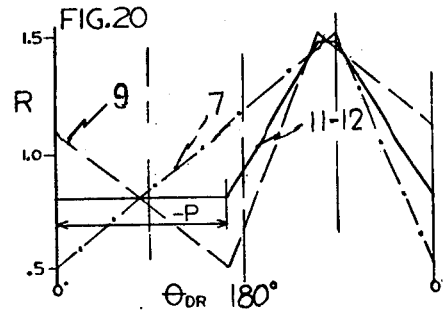
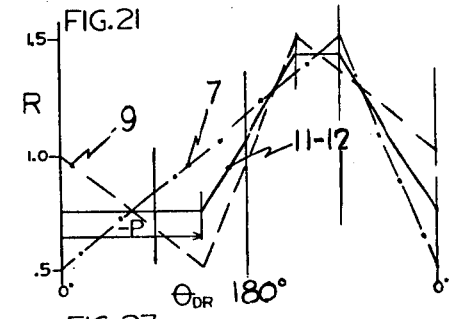
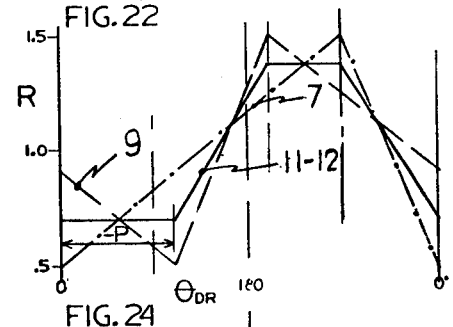
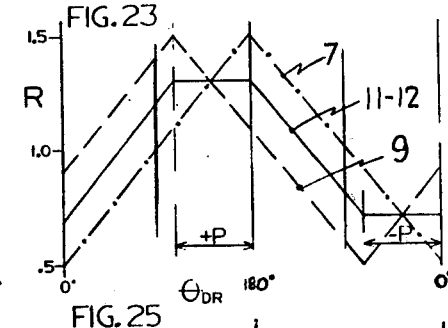
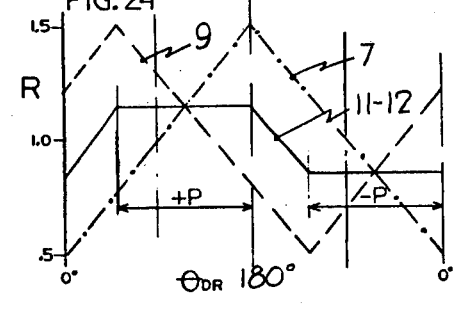
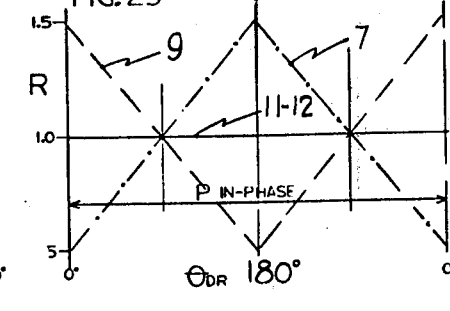

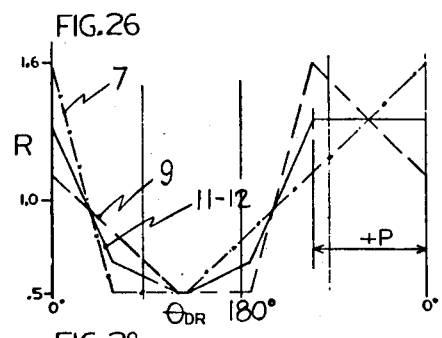
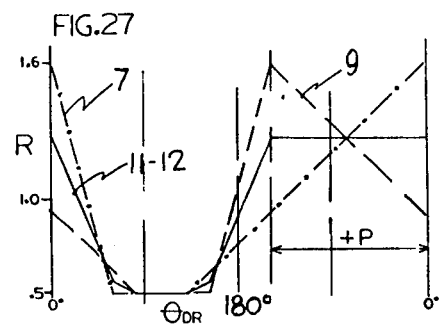
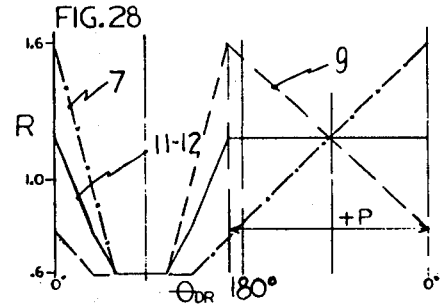
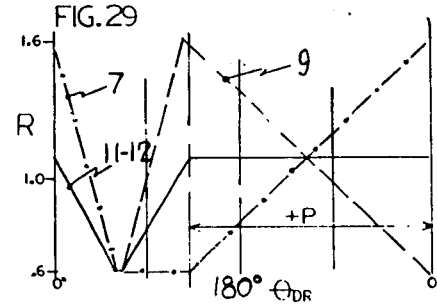
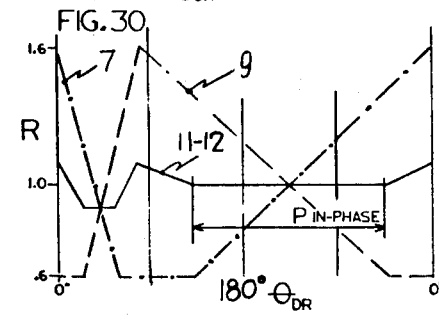
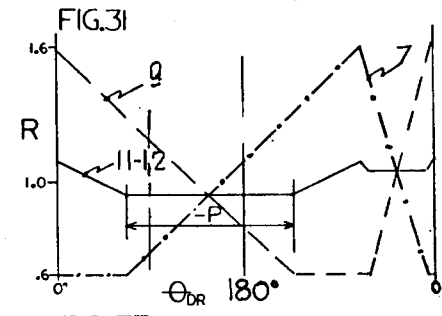
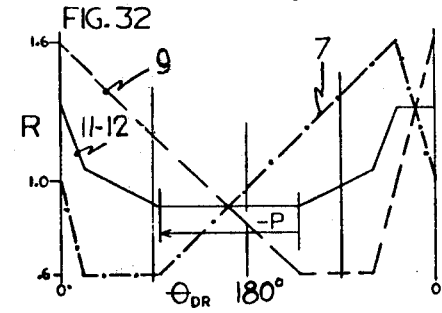
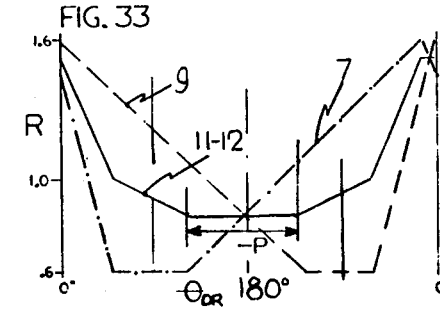

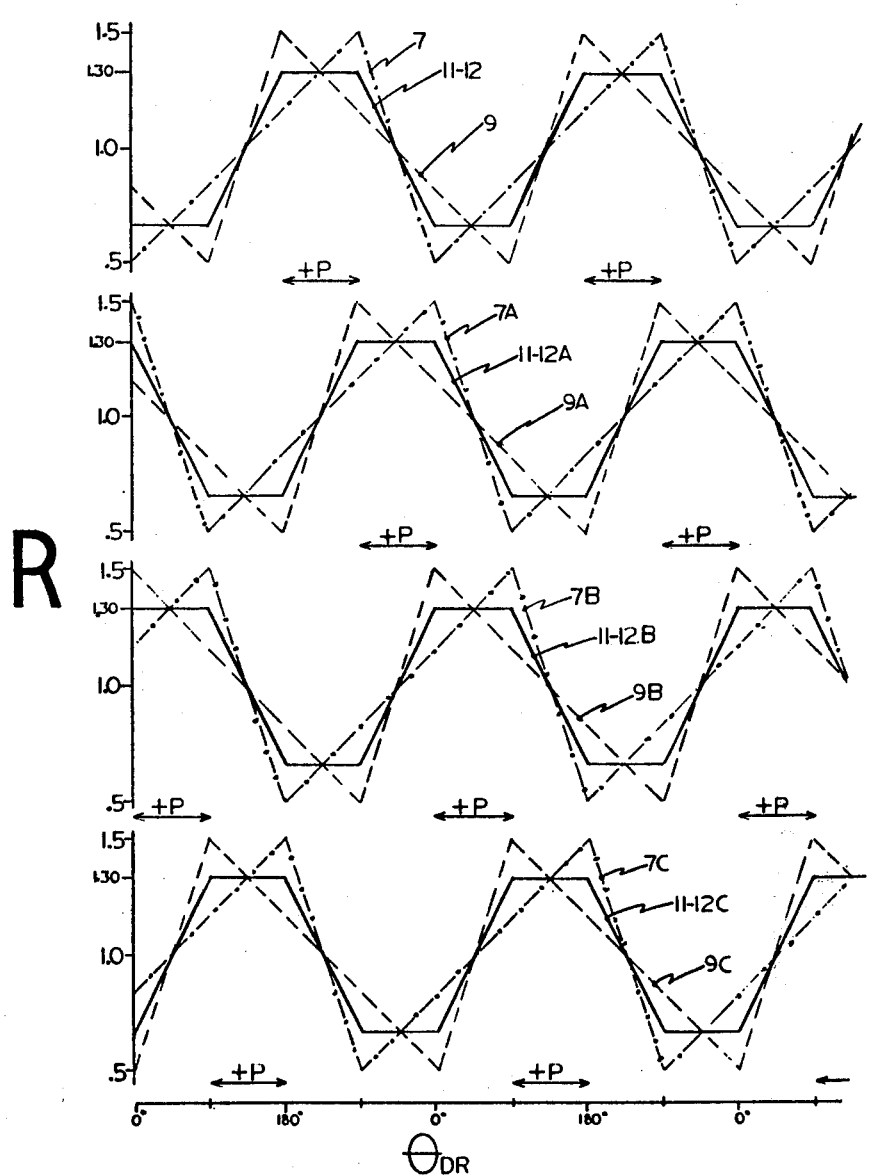

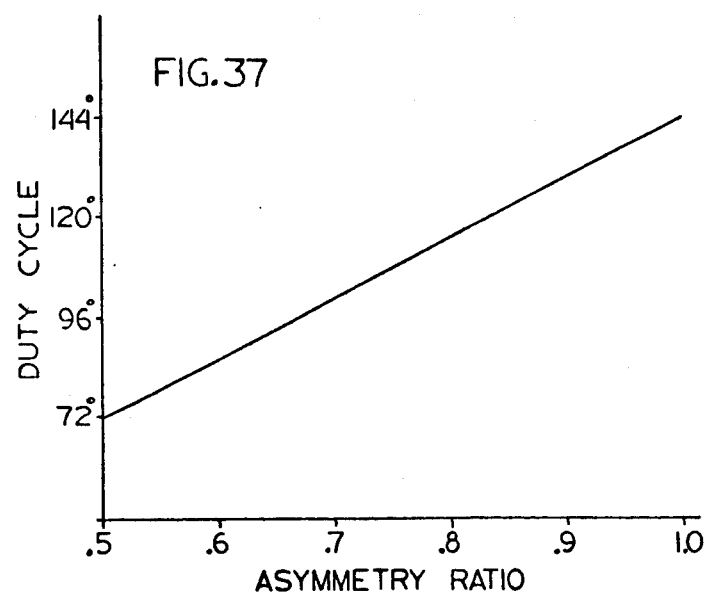
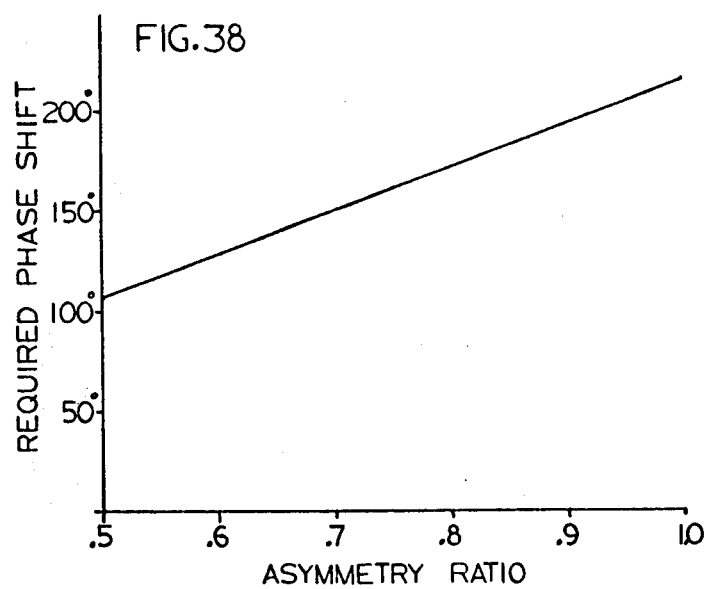

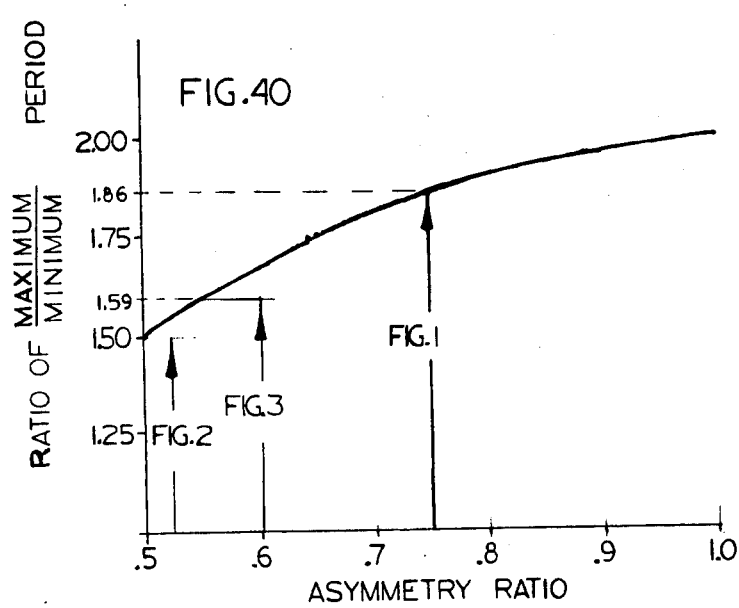
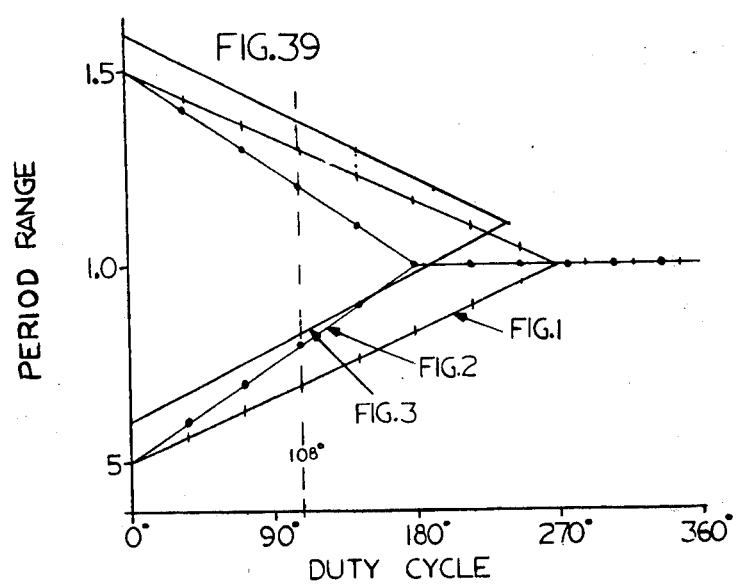

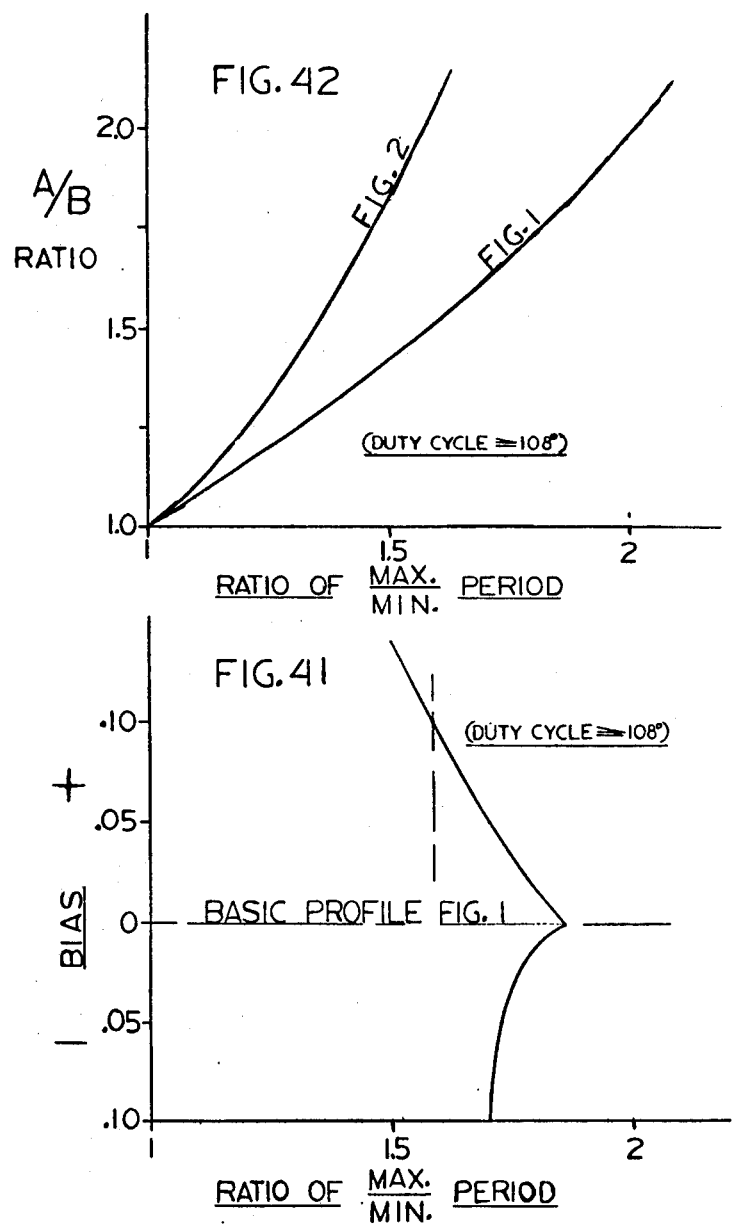

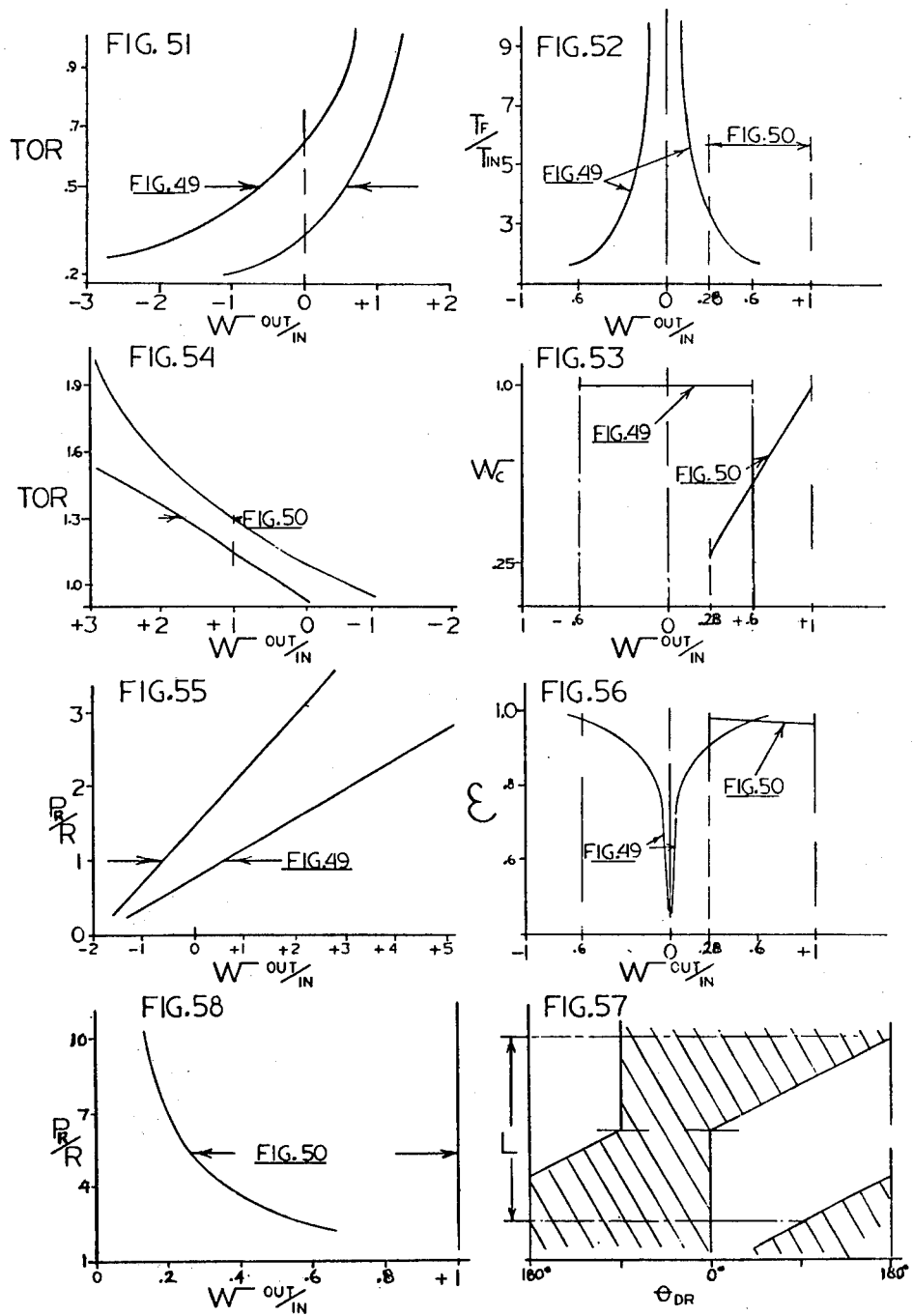

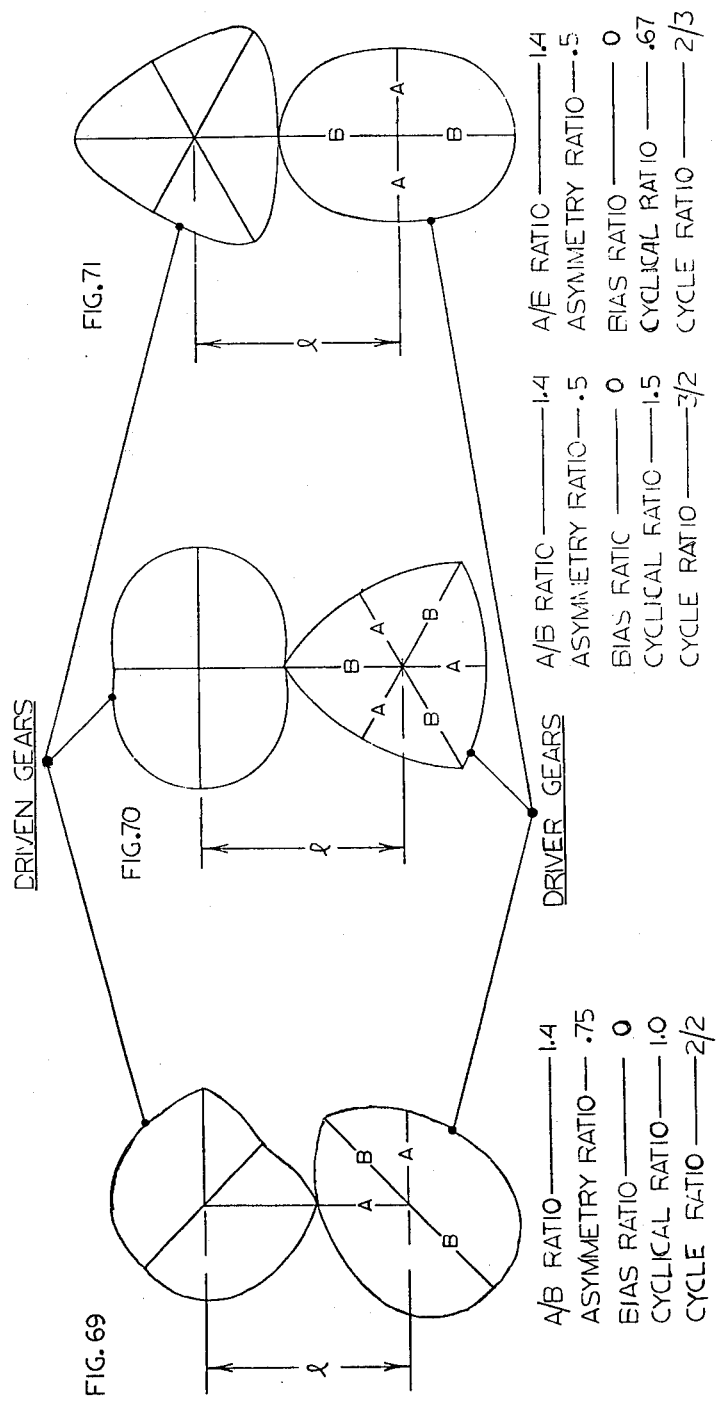

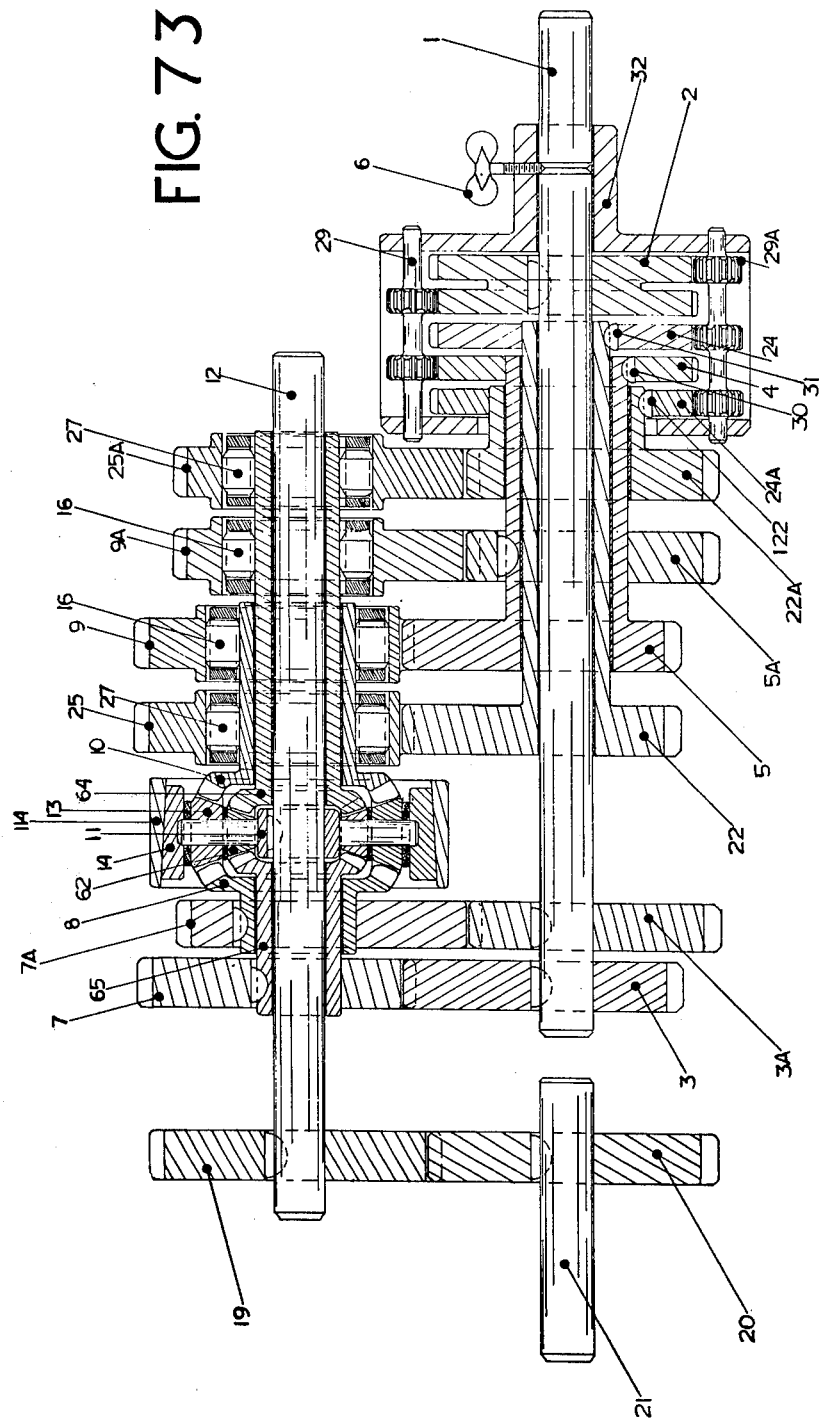

VARIABLE OUTPUT TRANSMISSION

This is a division, of application Ser. No. 390,454 filed Aug. 22, 1973, now abandoned.

This invention is related to non-friction drive mechanical transmissions of the infinitely variable type. The specific technology claimed by this invention pertains to the embodiments of a transmission drive system having the property of sinuous dynamic translation, obtained through affixing the driven gears of congruous pairs of continuously rotating variable ratio spur gears to the two bevel gears of a differential, or so mounted that they cyclically couple to the bevel gears, together with a shaft carrying the differential carrier and pinions; the congruent spur gears having pitch circle profiles such that when the two differentially mounted driven gears are rotated by their driver gears, firmly affixed to an adjacent constantly rotating parallel shaft, will cause the rotational pattern of the differential carrier and affixed shaft to vary from that of steady rotation, to one having transient cyclical periods of constant velocity progressively greater and then less than the steady rotational condition as the relative angle affixing the driver gears to their common shaft is increased or decreased: forming effectively a mechanical square-wave generator capable or varying the amplitude of the velocity wave-form of the differential carrier in a cyclical sinuous pattern in respect to the normal steady rotational velocity.

Some kinematic lay-outs of the transmissions, disclosed in this invention, have embodiments that pertain to many of the disclosed variable ratio transmissions where torsional energy is split from the main kinematic path and then recirculated within the drive train through the use of epicyclic gear trains, that effectively act as logarithmic differential amplifier, with the necessary initial translation coming from expanding pulley belt drives, or variable speed hydraulic units. However, the use of mechanical square-wave generator mechanisms, as the necessary initial method of translation for such transmission drives, is unique, and cannot be compared to any of the present state of the art. Therefore, no specific reference has been made to other inventions.

Although not necessarily directly related to this invention my co-pending Canadian Pat. No. 1,000,074, issued Nov. 23, 1976 applications Ser. No. 164–296, filed Feb. 21, 1973, titled "Variable Output Transmission;" and Ser. No. 160, 906, filed Jan. 09, 1973, Canadian Pat. No. 1,000,074, issued Nov. 23, 1976 titled "Worm/ Worm-Wheel Overrunning Clutch;" do have a significant bearing on the general technology disclosed by this invention, particularly Serial No. 160, 906, since the worm coupling units afford a positive coupling action.

It is an object of this invention to disclose the mechanical principle of variable ratio spur gear square-wave generators, and to qualify the requried embodiments of the pitch circle profiles of the spur gear elements in terms of criteria that will permit selection from the large range of possible variable ratio spur gears, those which comply in an intuitive sense with the practical application of the property of dynamic translation inherent in square-wave generators, for the simple translation of mechanical energy, together with an appropriate selection of controlling mechanisms.

A further object of this invention is to assign the locations of the coupling units, and to establish the requirements for coupling units having either internal, or external coupling intelligence.

The final object of this invention is to qualify specific kinematic layouts of the drive elements of transmissions, that embody spur gear square-wave generators, as the basis of the claim to an infinitely variable mechanical transmission.

Figure 2:
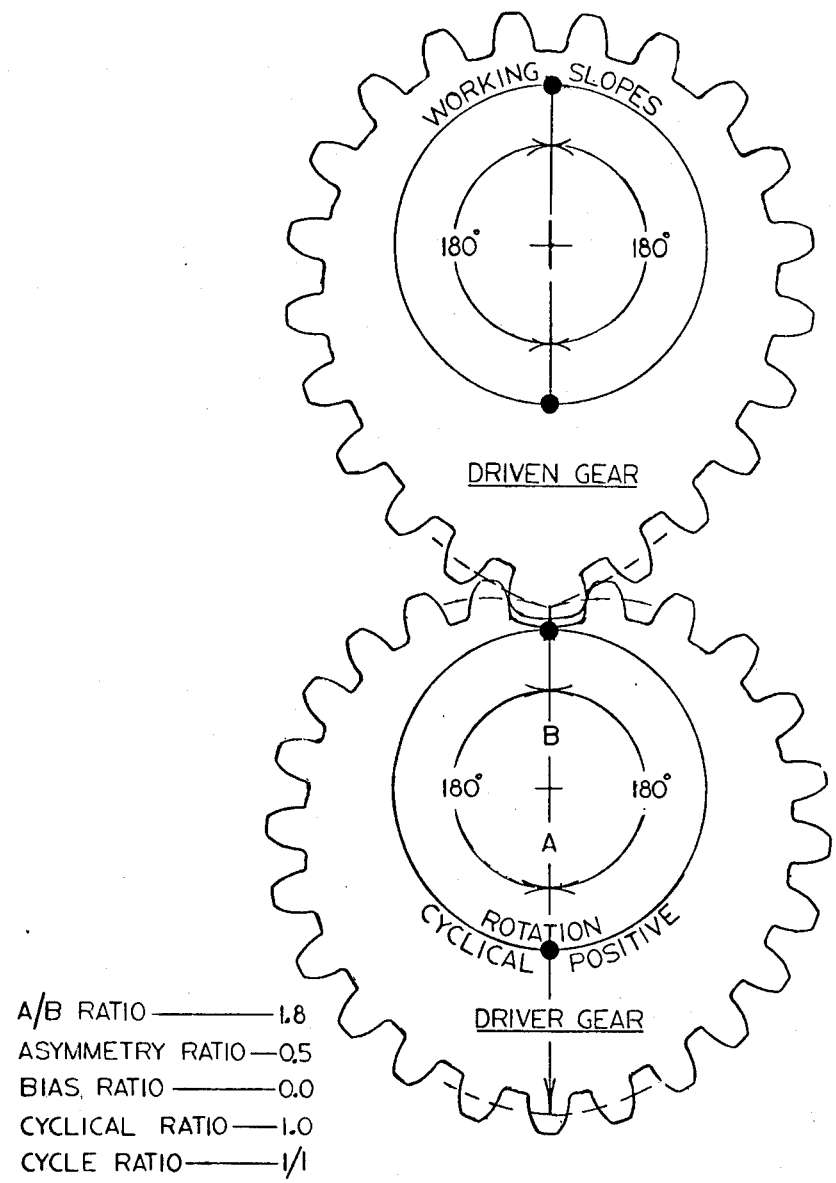
Figure 3:
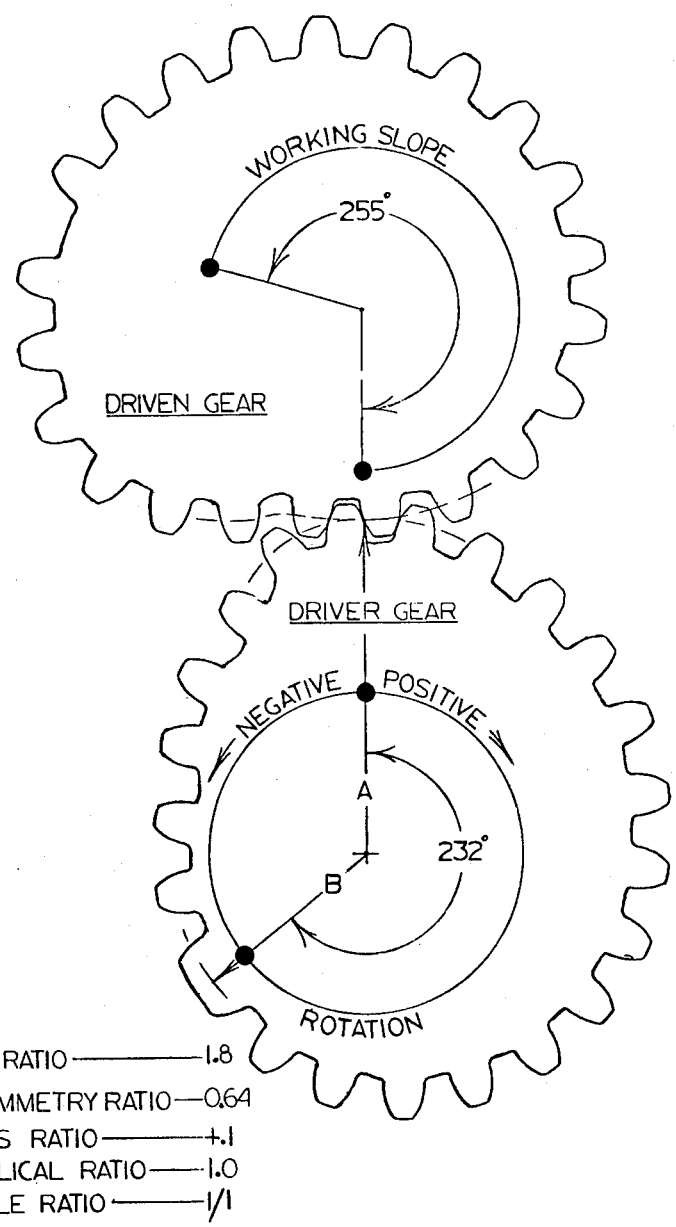

Other features and characteristics of this invention will be apparent from the following detailed description and explanations taken in conjunction with the accompanying drawings, in which:

FIGS. 1 to 3—show the three basic profiles of generator elements

Figure 4:
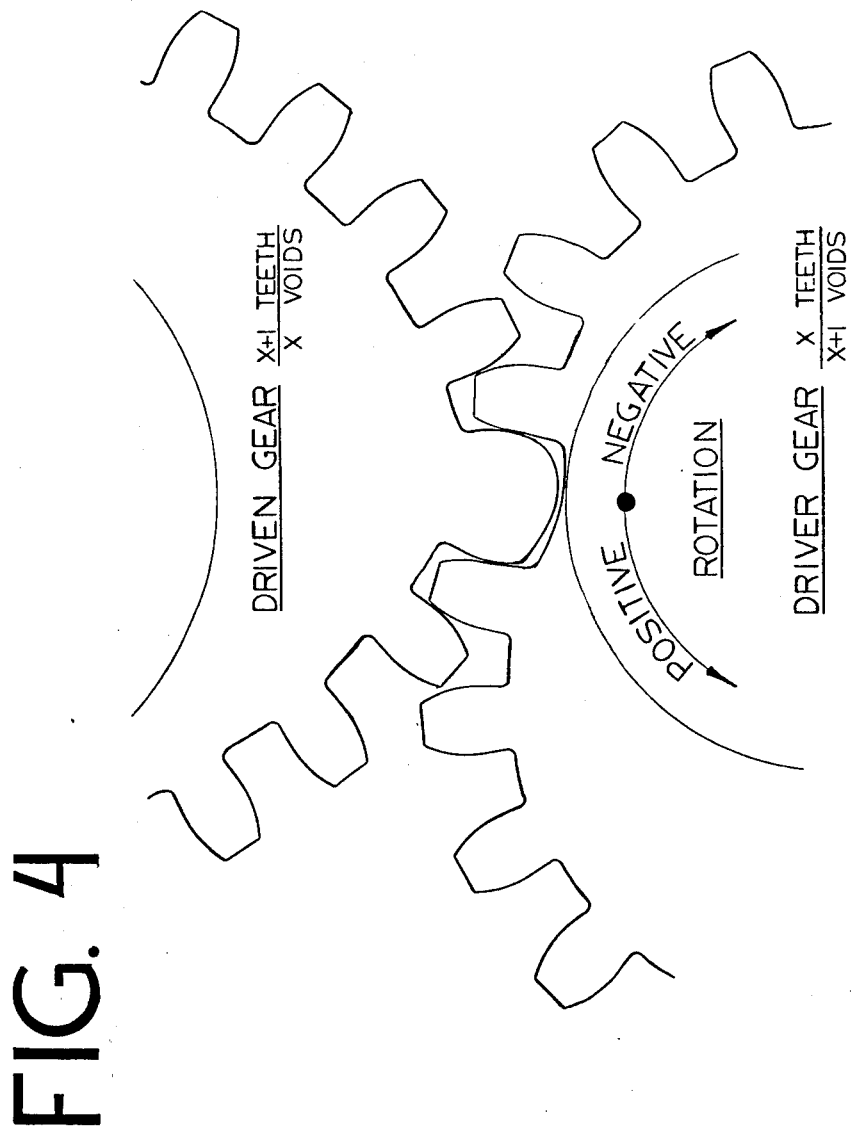

FIG. 4—shows the preferred configuration of gear teeth

Figure 5:
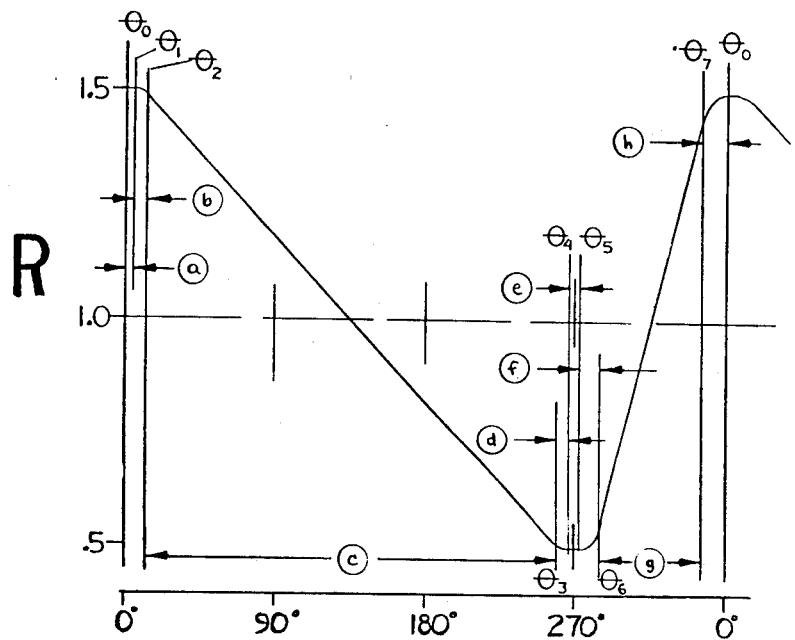
Figure 6:
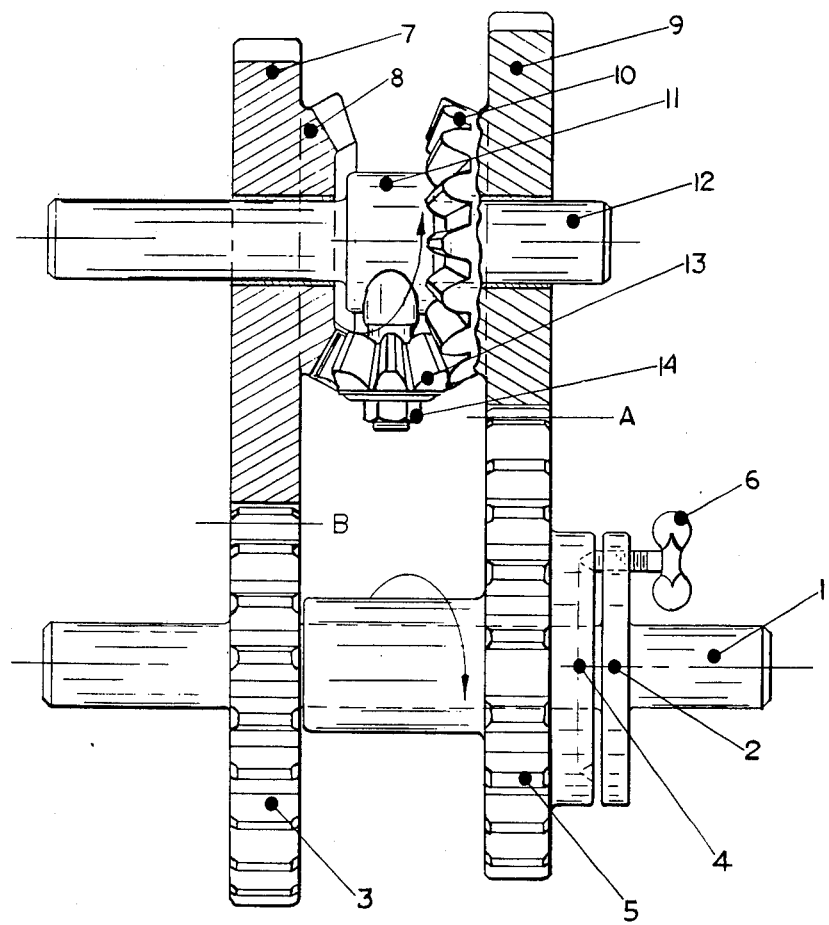

FIG. 5—shows a graph of the rotational characteristics of congruent generator elements FIG. 6—shows the basic configuration of a square-wave generator FIGS. 7 to 9—show the instantaneous in-phase velocity relationship of the differential carrier and driven generator elements for the profiles of FIGS. 1 to 3

FIGS. 10 to 22—show the changing cyclical pattern of the differential carrier with the profiles of FIG. 1

FIGS. 23 to 25—show the changing cyclical pattern of the differential carrier with the profiles of FIG. 2

FIGS. 26 to 33—show the changing cyclical pattern of the differential carrier with the profiles of FIG. 3

Figure 34:
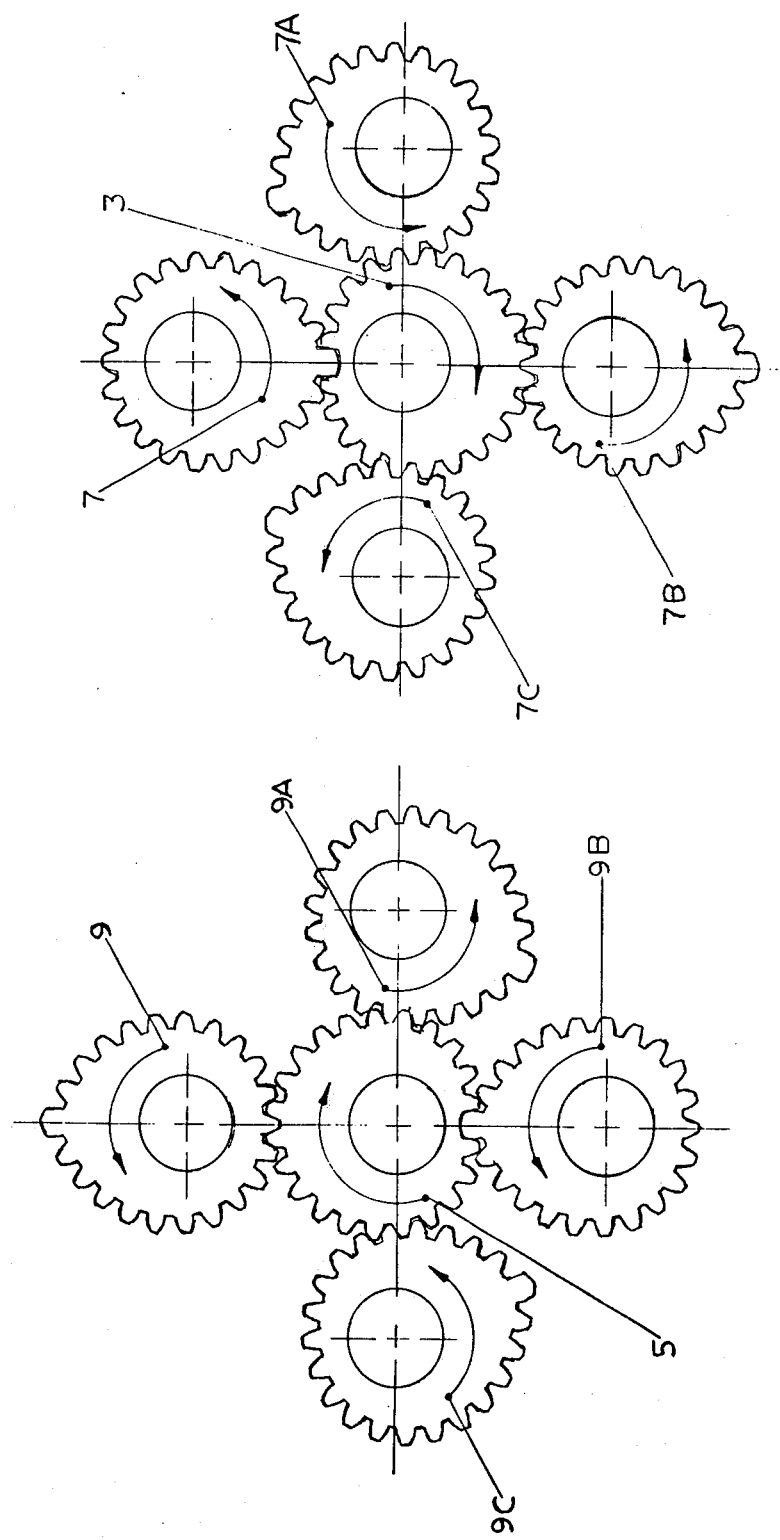

FIG. 34—shows the relative relationship of the driven/driver generator elements of four generators with profiles of FIG. 2

Figure 35:
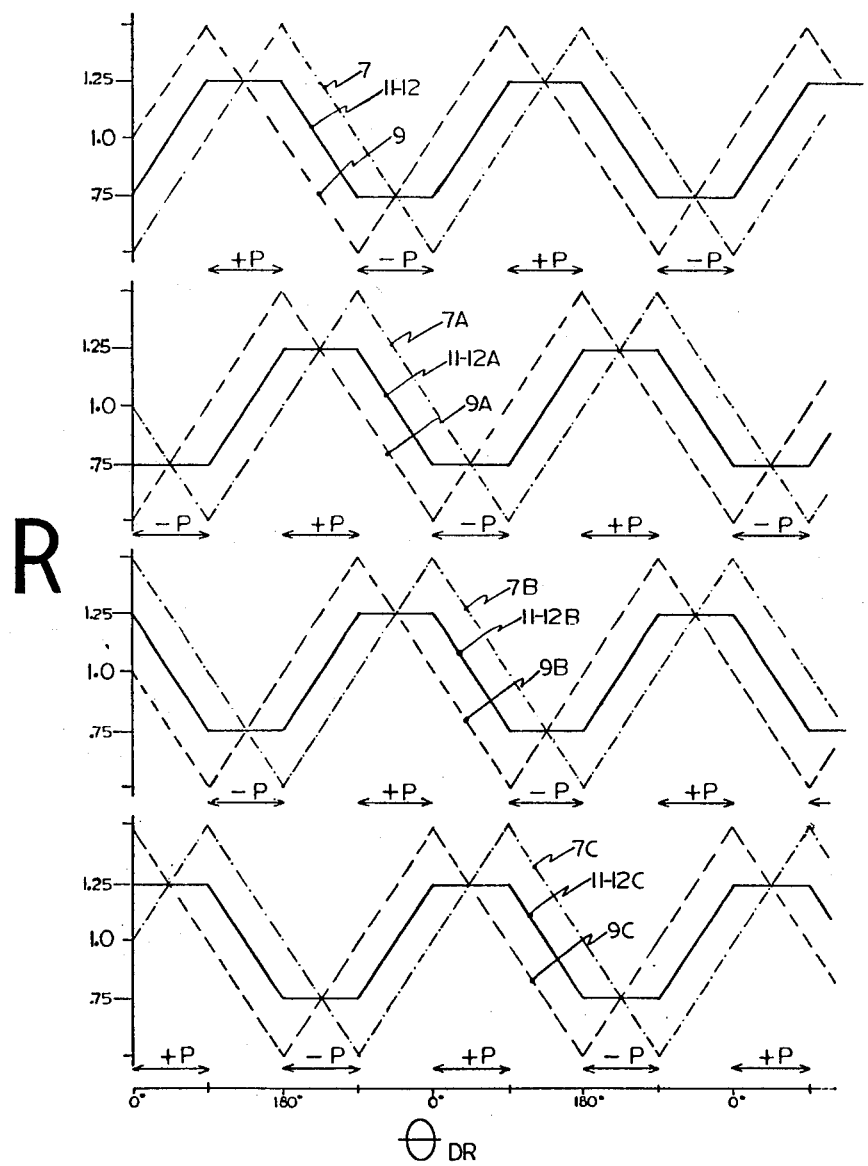

FIG. 35—shows the 90° Duty Cycle Periods of the configuration of FIG. 34

FIG. 36—shows the 90° Duty Cycle Periods with profiles of FIG. 1

FIG. 37—shows Duty Cycle against Asymmetry Ratio

FIG. 38—shows required phase shift against Asymmetry Ratio

FIG. 39—shows the Period/Duty Cycle relationship

FIG. 40—shows the effects of Asymmetry Ratio against Periods

FIG. 41—shows the effects of Bias Ratio against Periods

FIG. 42—shows the effects of A/B Ratio against Periods

FIGS. 43 to 46—show simple transmission lay-outs with overrunning couplings

Figure 47:
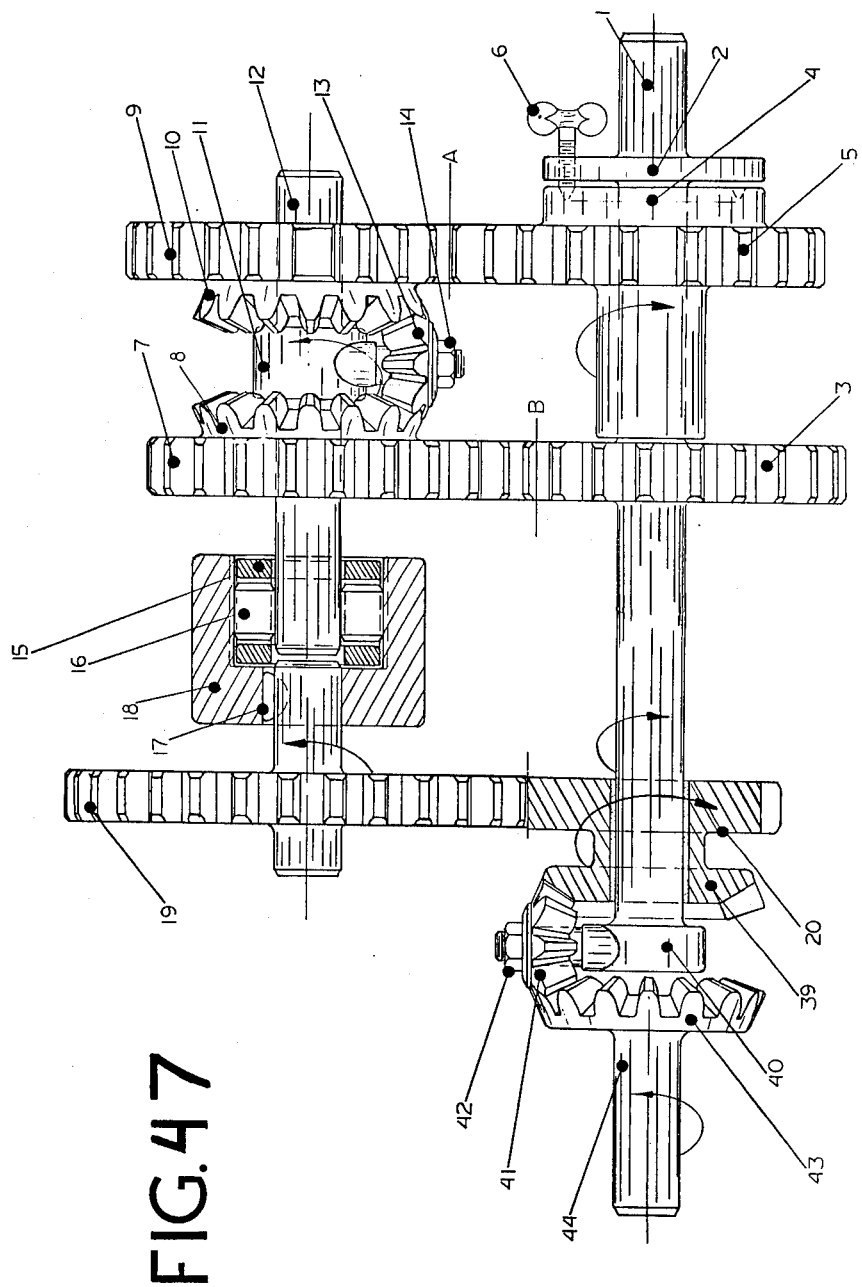

FIG. 47—shows a simple transmission lay-out with added epicyclic gear train

Figure 48:
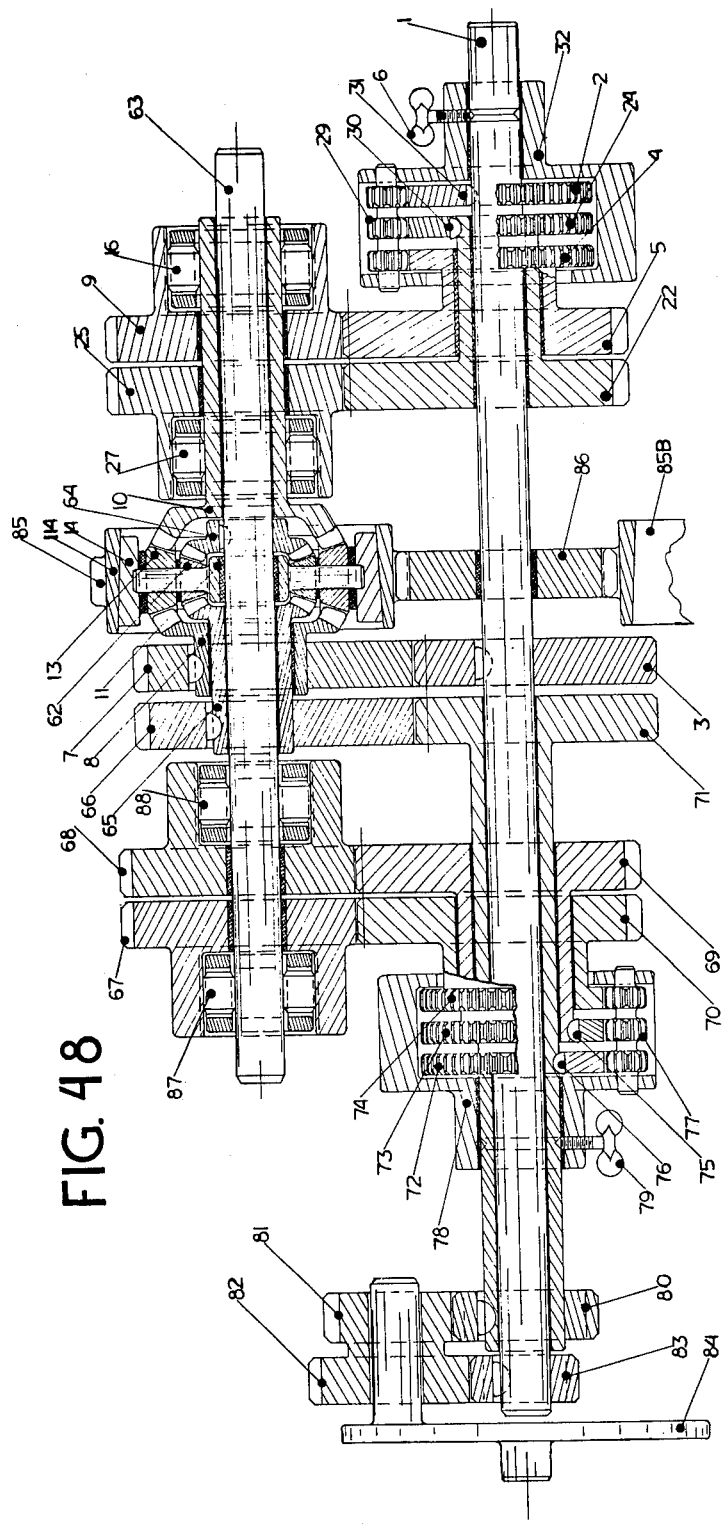
Figure 49:
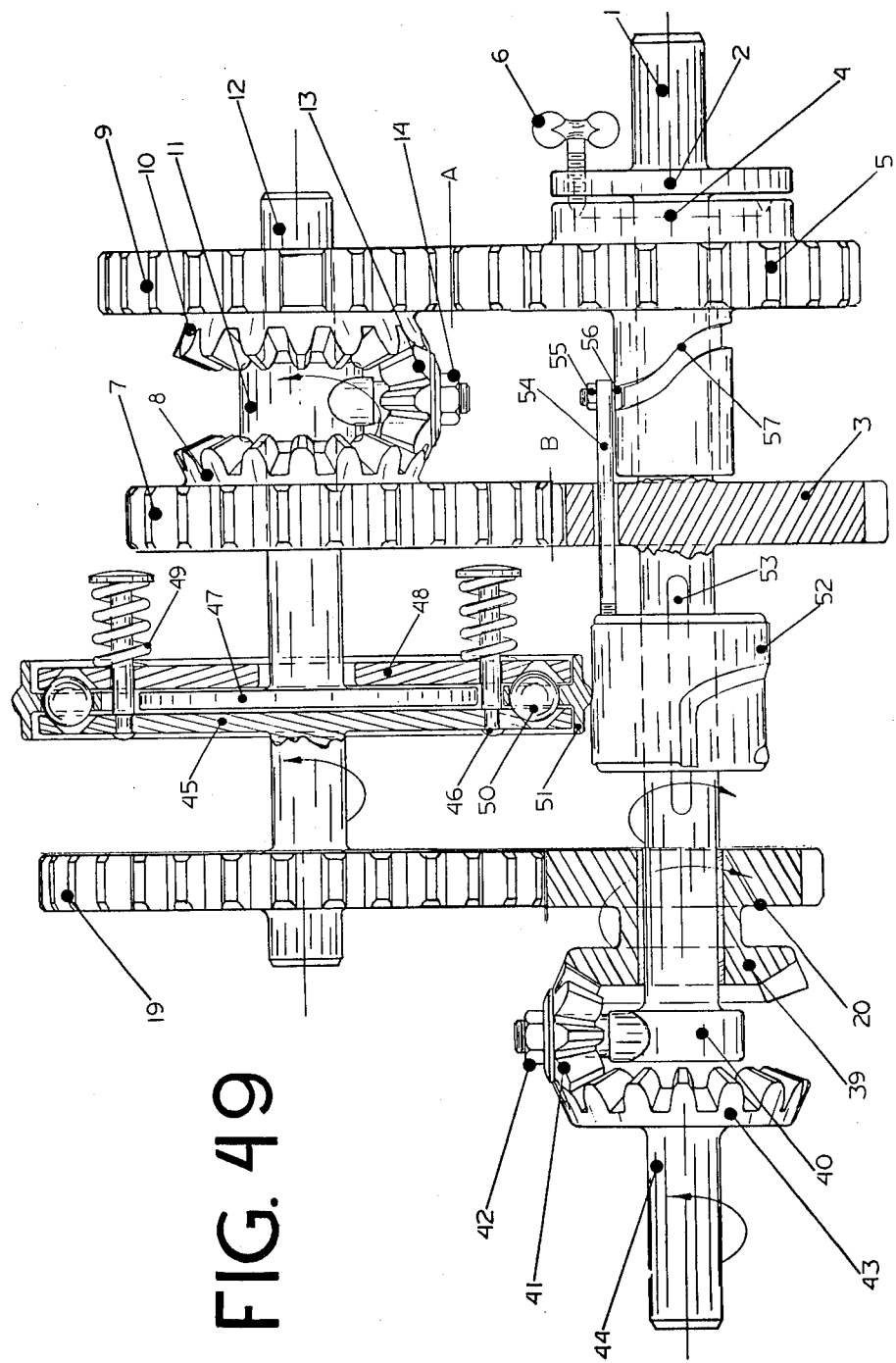
Figure 50:
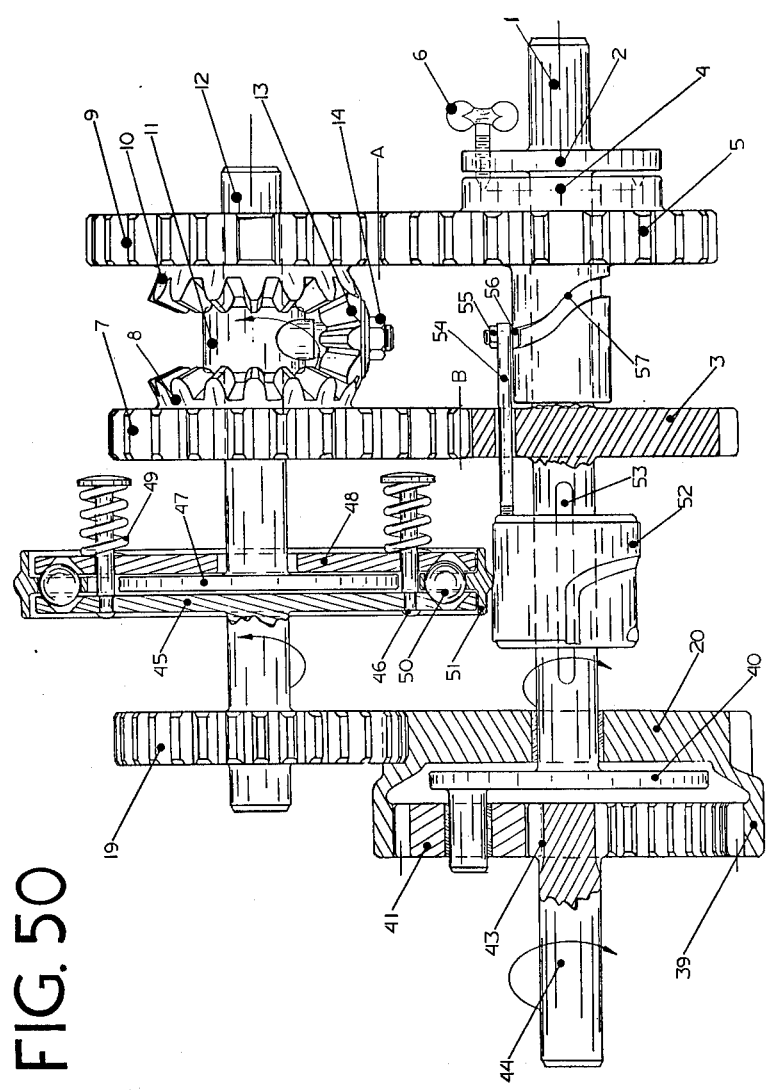

FIG. 48—shows a complex series transmission lay-out with added spur epicyclic gear train FIG. 49—shows a simple transmission lay-out with added epcyclic gear train, programmed coupling units, with a bi-directional output element FIG. 50—shows a simple transmission lay-out with added epicyclic gear train, programmed coupling units, with a unidirectional output element.

FIGS. 51 to 56 and 58—show the changing kinematic characteristics of the transmissions lay-out of FIGS. 49 and 50 with changes in drive element ratios FIG. 57—shows the uncoupling cam profile of FIGS. 49 and 50

Figure 59:
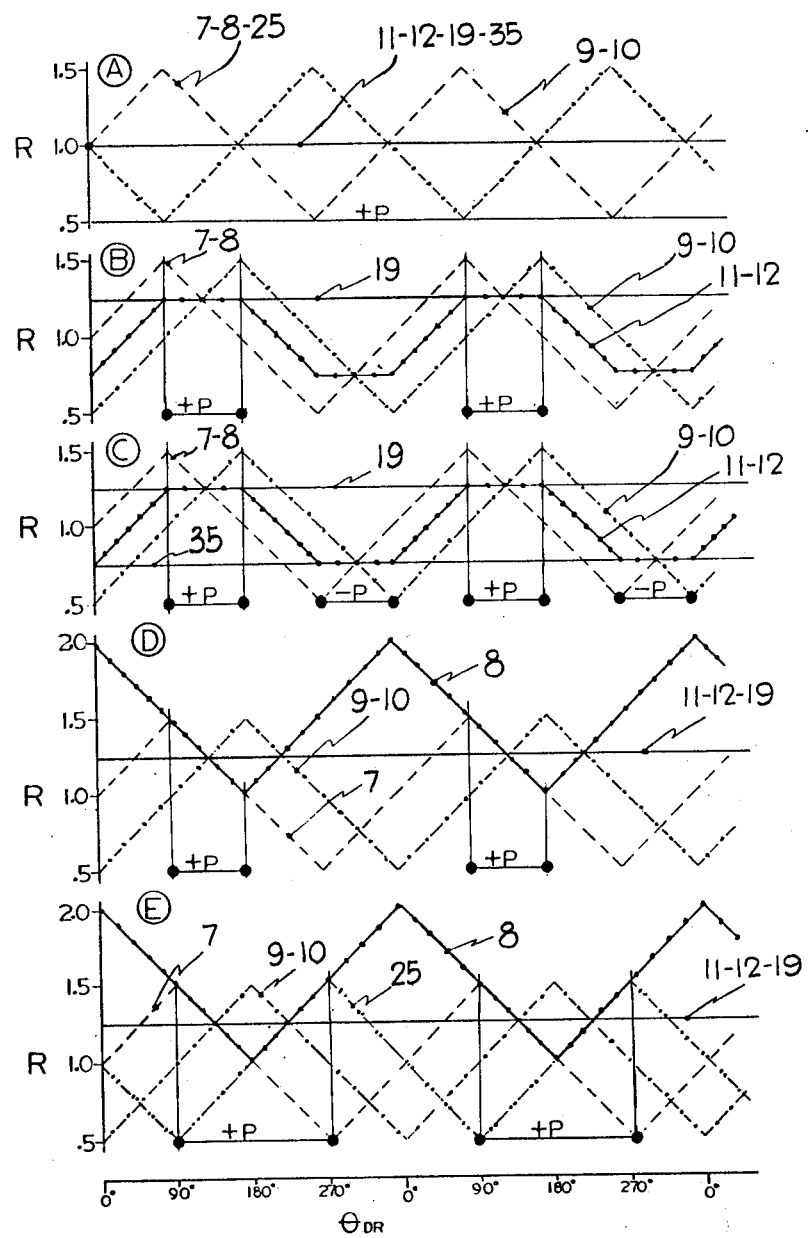

FIG. 59—shows the kinematics of lay-outs FIGS. 43 to 46

Figure 60:
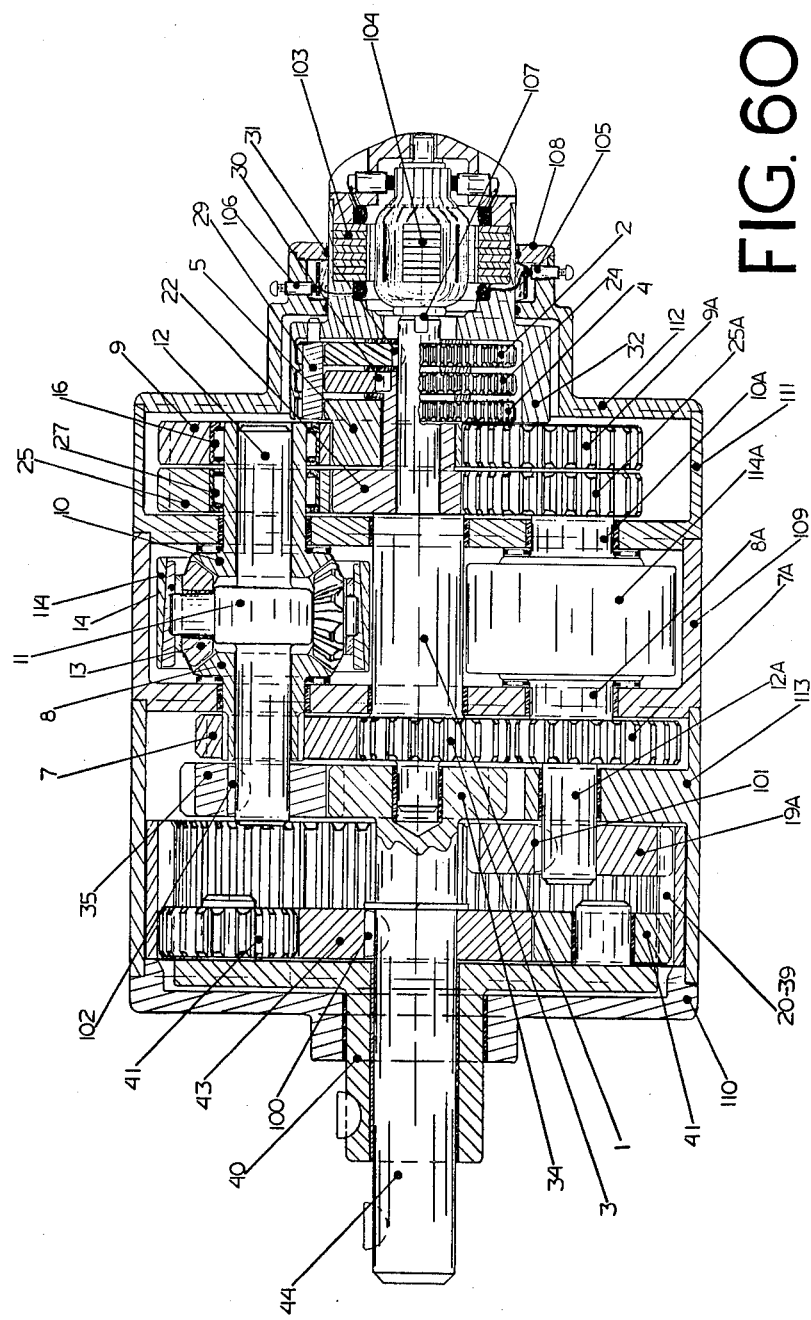
Figure 61:
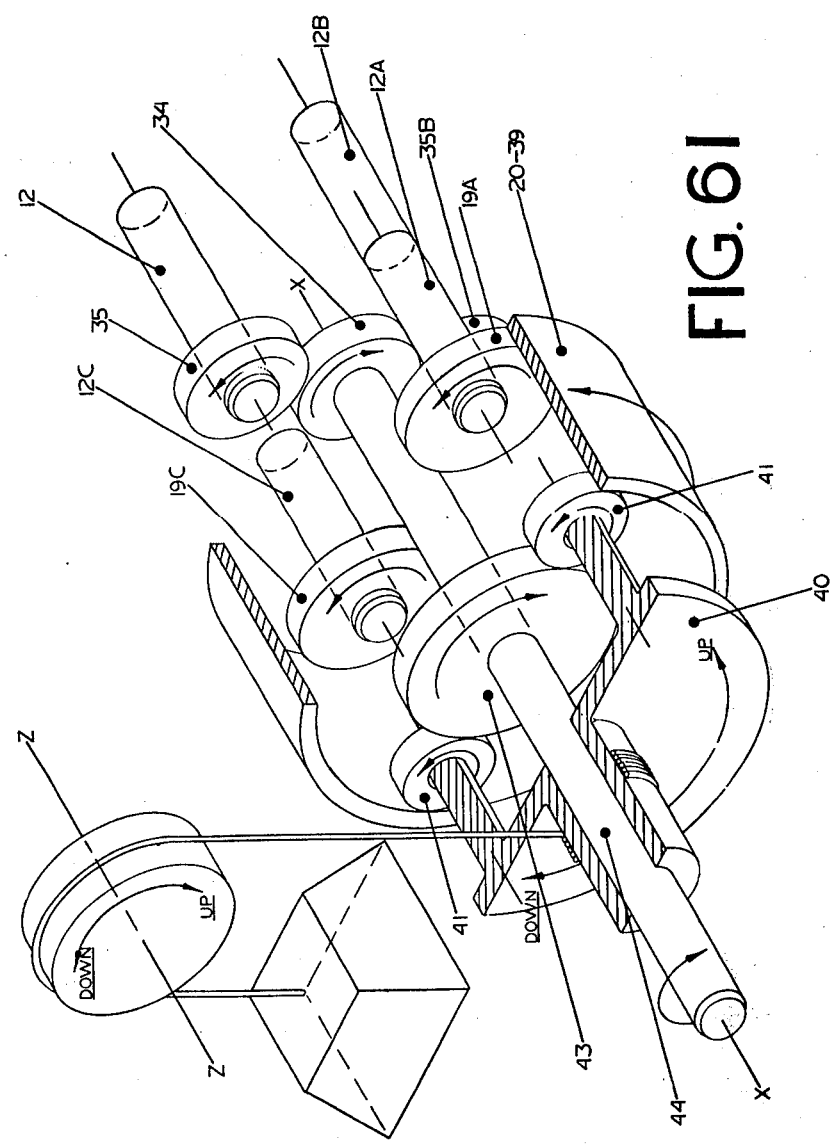

FIG. 60—shows a simple series transmission lay-out with added epicyclic gear train, overrunning couplings, and electric control motor FIG. 61—shows the take-off gears of FIG. 60

Figure 62:
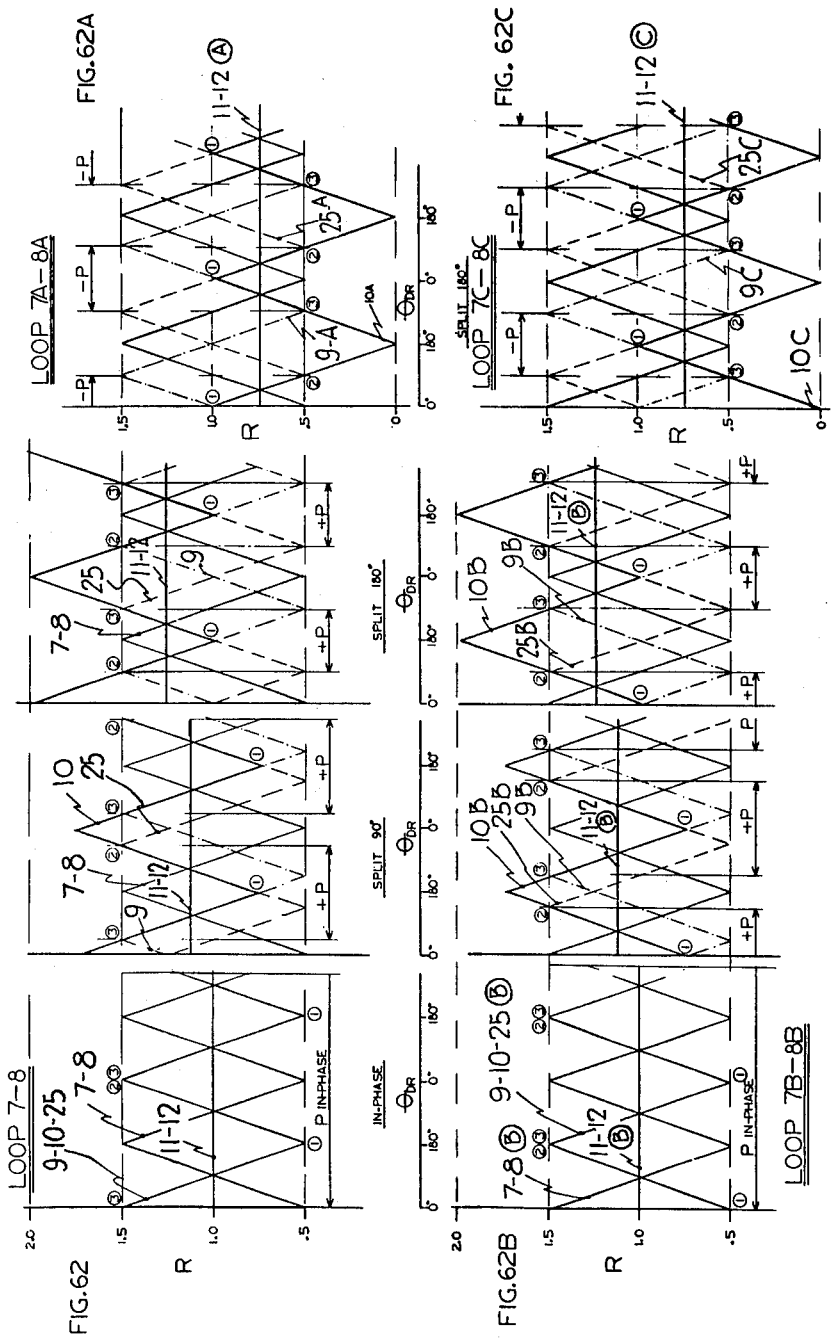
Figure 63:
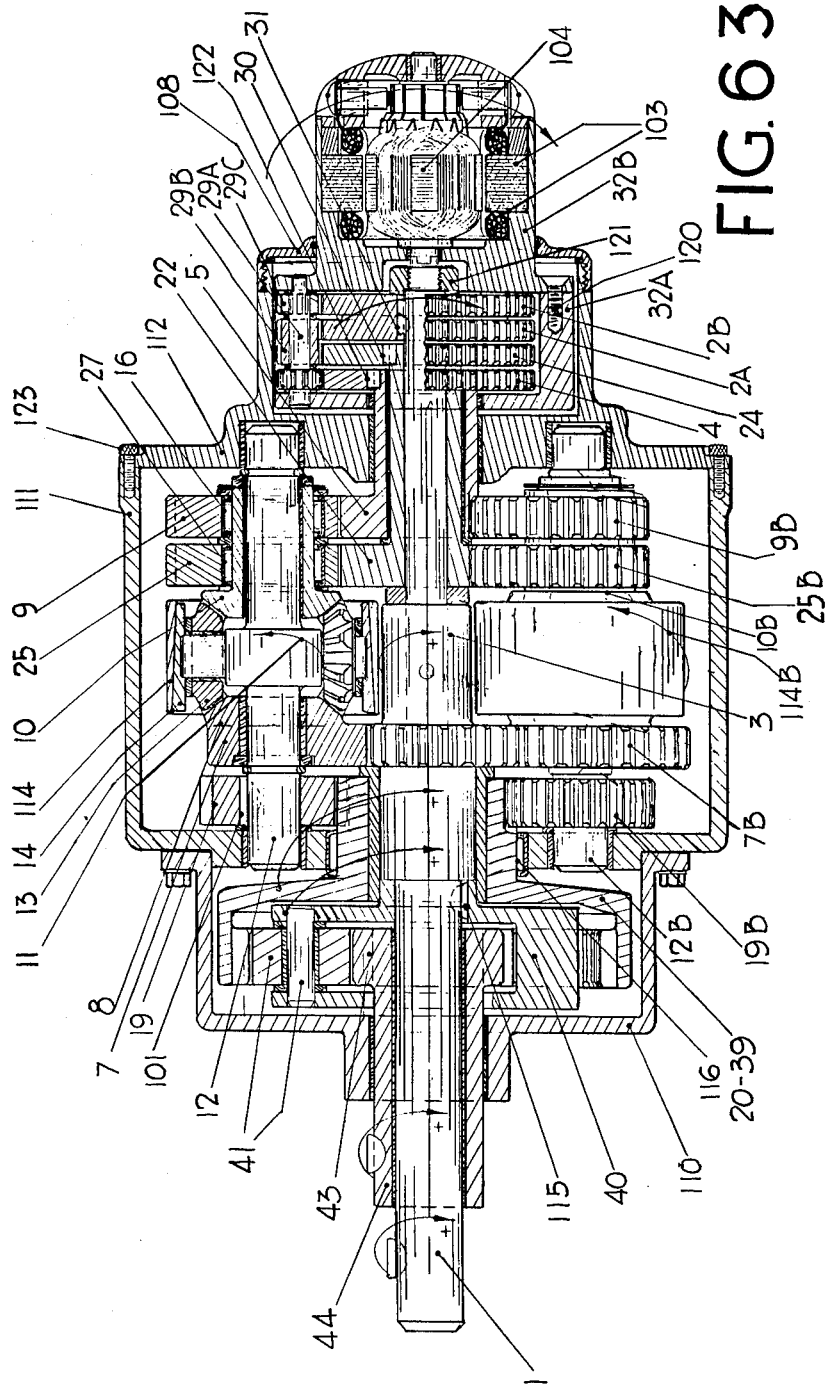
Figure 64:
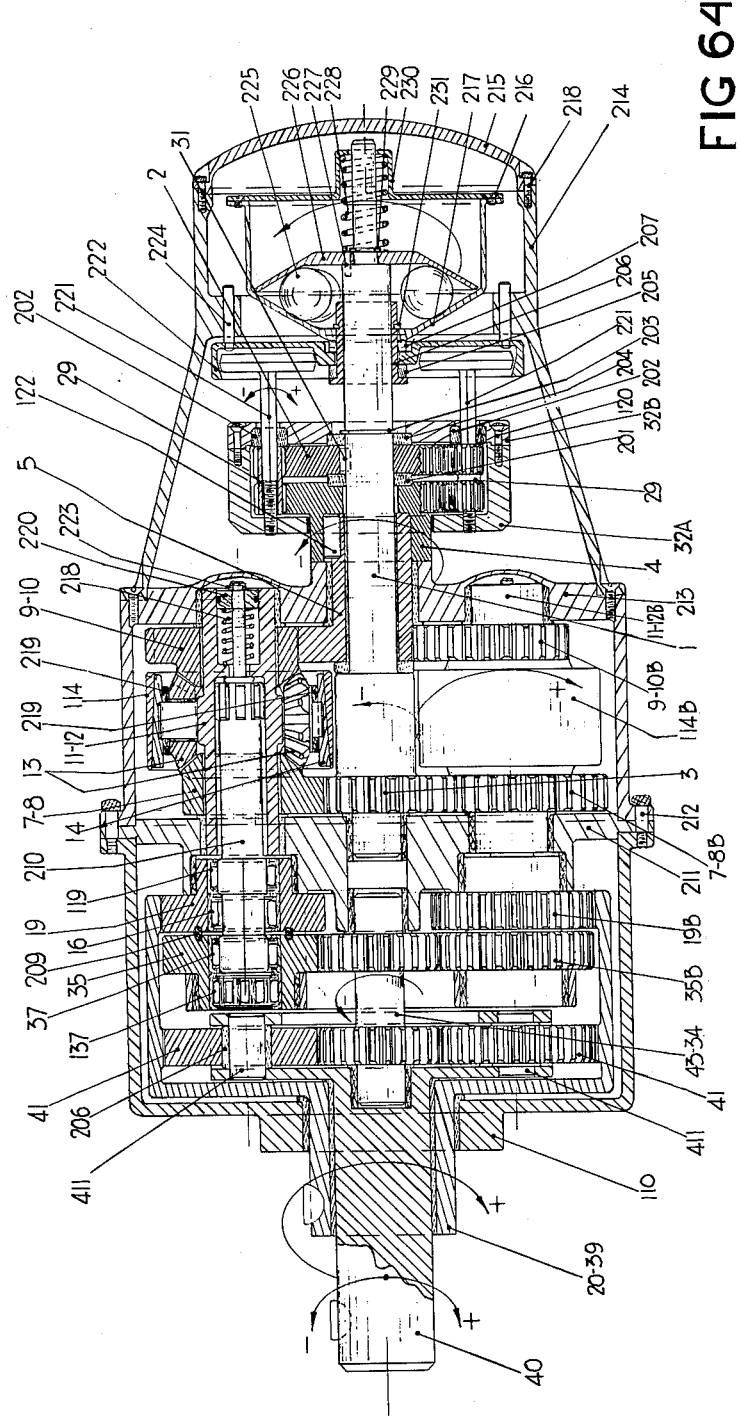
Figure 65:
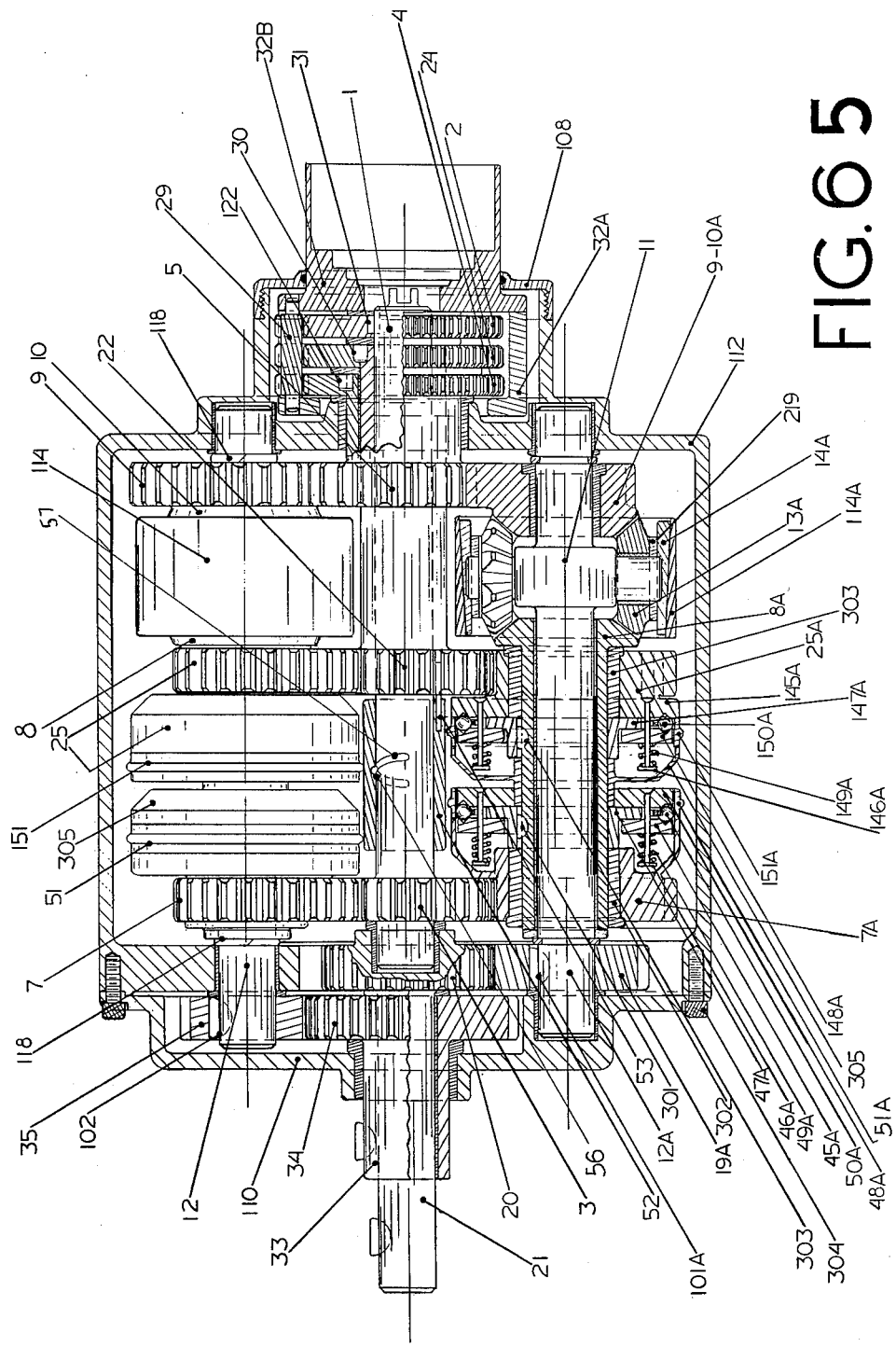
Figure 66:
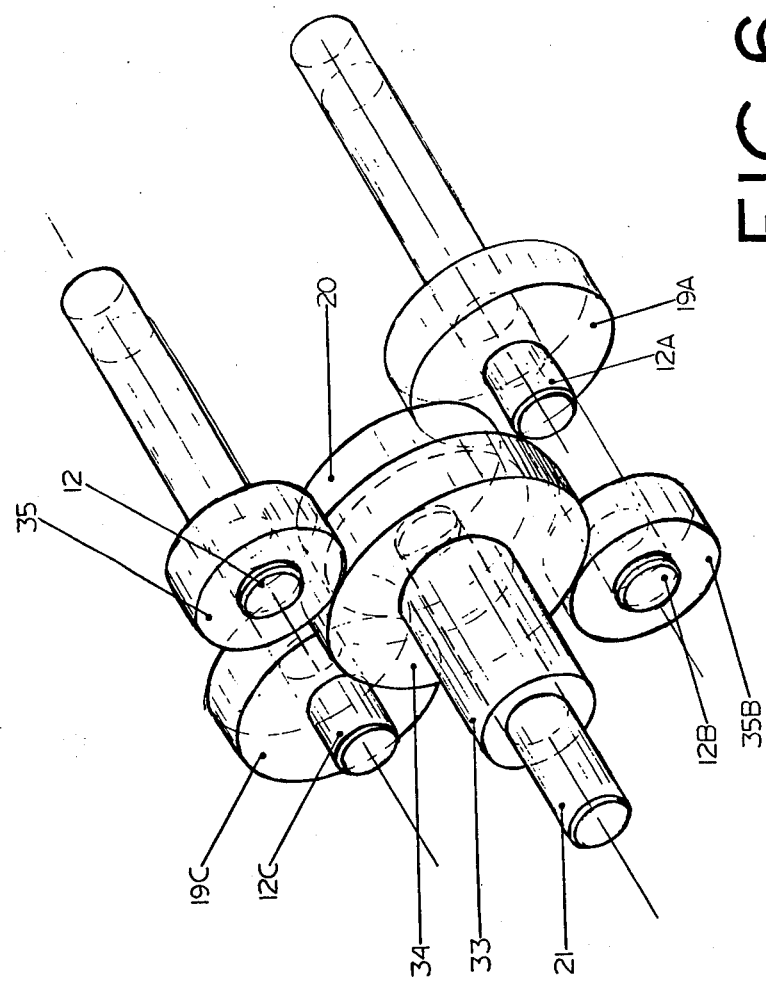

FIG. 62—shows the kinematics of FIG. 60 for various Translation Ratios of the Input Velocity FIG. 63—shows a simple transmission lay-out with added epicyclic gear train, and electric control motor FIG. 64—shows a simple series transmission lay-out with added epicyclic gear train, and reversing shaft FIG. 65—shows a simple series transmission with programmed couplings FIG. 66—shows the take-off gears of FIG. 65

Figures 67, 68:
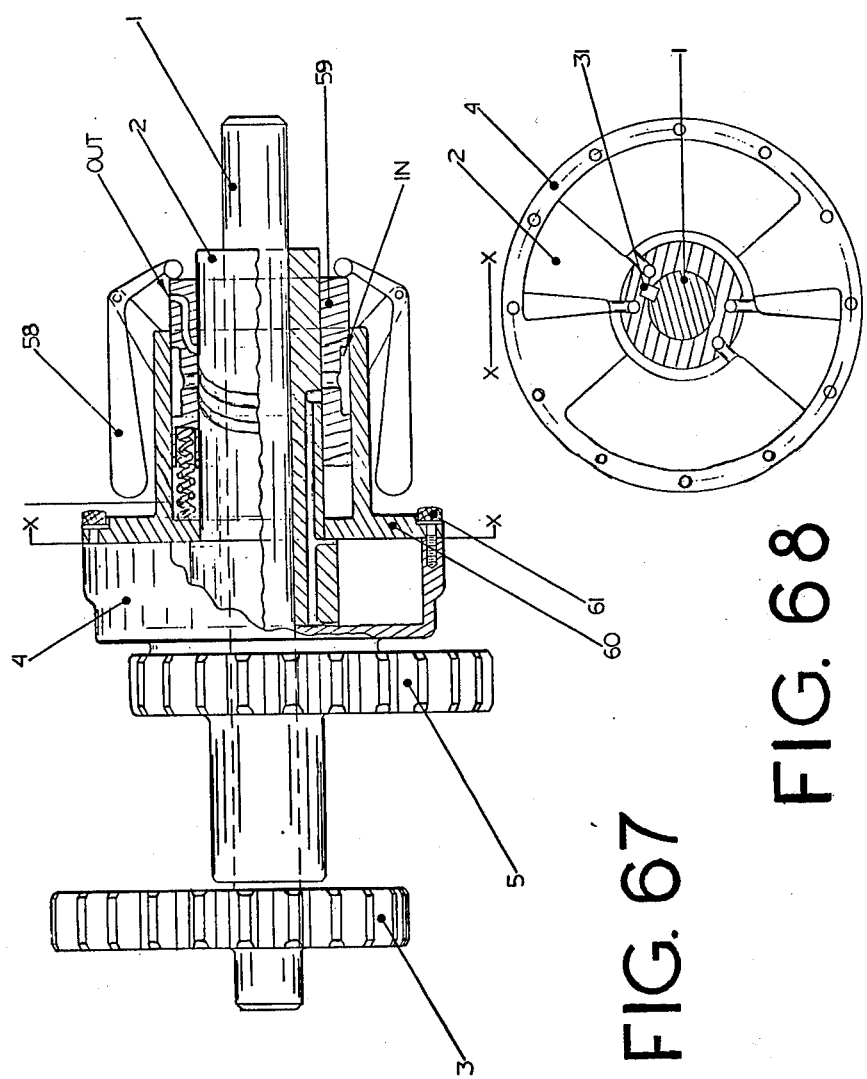

FIGS. 67 and 68—show an angular velocity responsive hydraulic control mechanism

Figure 72:
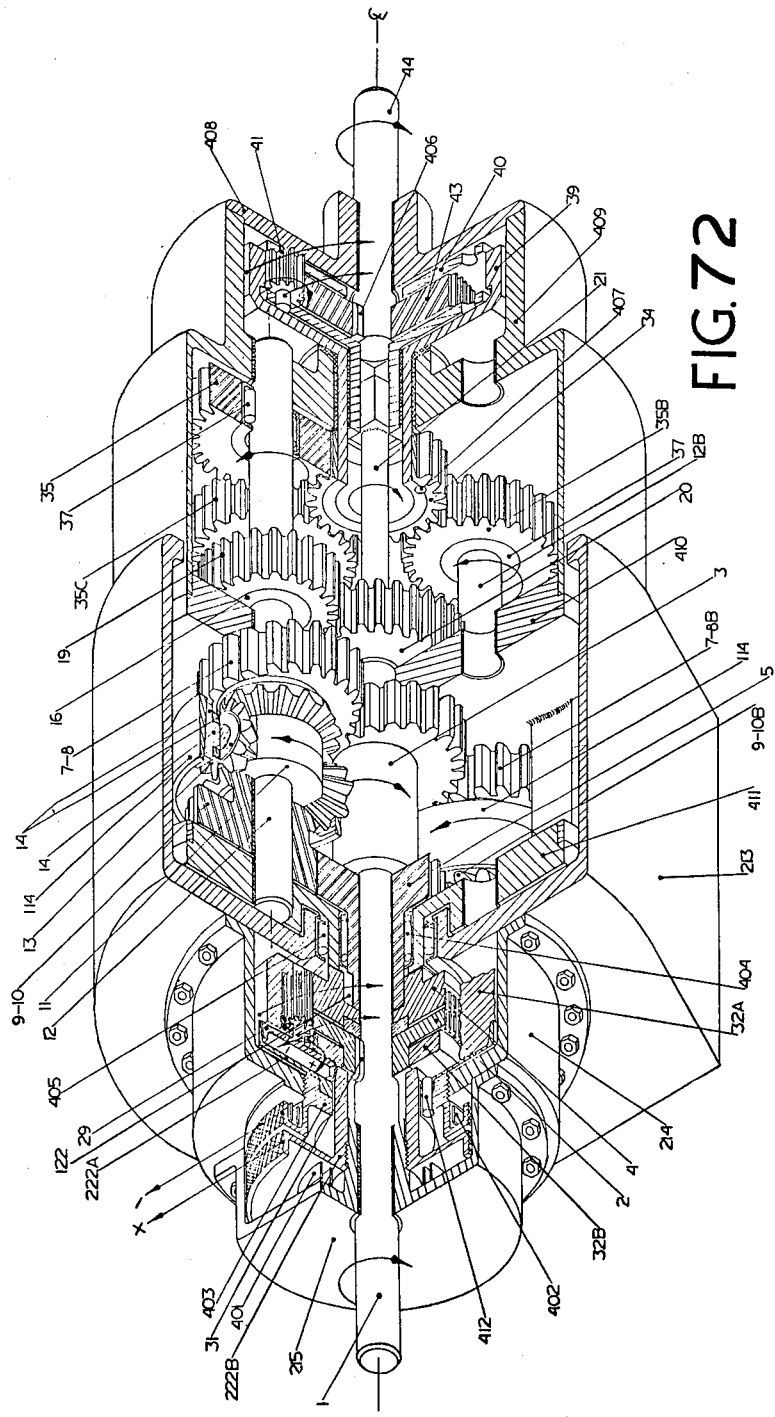

FIGS. 69 to 71—show the pitch circle profiles of spur gear square-wave Generator Elements of different specification FIG. 72 shows an isometric, quarter section view of a compound transmission lay-out with added epicyclic gear train, and a manual control system FIG. 73—shows a complex/simple transmission lay-out

GLOSSARY OF TERMS AND SYMBOLS

Participating drive elements—are rotating elements in the drive system that contribute directly to the transmission of the external torques Non-participating drive elements—are elements in the drive system that do not contribute directly to the transmission of external torque Take-off gears—the last and adjacent plain gear elements of the basic inverted gear trains with the last element designated the driven gear irrespective of the direction of torque forces between the two gears Take-off Ratio—number of teeth on driver divided by the number of teeth on the driven Generator elements—the congruent pairs of variable ratio spur gears with the driver gear designated as the one having a constant angular rotation irrespective of the direction of torque forces between the two gears In-phase—refers to the angle between the driver gears when the differential carrier has a constant velocity Period—refers to the transitory modes in the gyration of the differential carrier when rotation is constant and torque loads through them form part of the kinematic continuum of transmission Duty Cycle—the elapsed angle of the Period as measured against the angular displacement of the driver gear Generator Elements Working Slopes—the sectors of the pitch circle profiles of the Generator Elements that are subject to loads during the Period Cyclical Ratio—is the ratio of pitch circle circumferences of the driver gear to the driven gear of Generator Elements Cycle Ratio—is the number of cycles on the driver gear/the number of cycles on the driven gear expressed as a whole fraction, i.e. 1/1, 1/2, 2/1, etc.

Asymmetry Ratio—is the maximum subtended angle between the maximum and minimum radius of the driver element divided by the subtended angle of the pattern cycle Translation—is the variation of angular velocity of torque on a drive element as caused by the property of the Square-wave Generators Translation Ratio—specific Translation between two given drive elements as related to their normal velocity $W_{\overline{DN}}$—the instantaneous velocity of the driven Generator Elements $W_{\overline{DR}}$—the instantaneous velocity of the driver Generator Elements R—the ratio of the instantaneous velocity of the driven gear, of differential carrier to that of the driver Generator Elements $\theta_{DN}$—the angular displacement of the driven gear as related to the cycle of the driver gear of Generator Elements $\theta_{DR}$—the angular displacement measured in degrees of the driver Generator Elements $l$—the distance between the axes of driven/driver Generator Elements TOR—Take-off Ratio TR—Trnsalation Ratio $T_F/T_{IN}$—the ratio of torque through the inverted gear trains to that on the input shaft of the transmission $P_R/R$—the ratio between the co-axial gears of the epicyclic gear train used as secondary amplifiers L—the axial displacement of the cylindrical cams of the externally programmed coupling units Rad. PC DR—the instantaneous pitch circle radius of the driver Generator Elements Rad. PC DN—the instantaneous pitch circle radius of the driven Generator Elements $\alpha$—angular acceleration of the driven Generator Elements CR—Cyclical Ratio PA—the instantaneous Translation Ratio between the differential carrier and the driver gear of the square-wave Generator when a Period is being generated t—time as measured against the angular displacement of the driver Generator Elements $W_{\overline{OUT}}$—angular velocity of the output shaft to the transmission $W_{\overline{IN}}$—angular velocity of the input shaft to the transmission $W_C$—the cyclical coupling frequency of the coupling units $\epsilon$—theoretical mechanical efficiency based on a loss of .5% of transmitted energy 1X, 2X, etc.—multiplication of one, two, etc.

A matching pair of common spur gears have constant pitch circle radii; a matching pair of continuous rotating variable ratio spur gears have cyclically varying pitch circle radii. Given any pair of variable ratio spur gears, the kinematic velocity pattern of the driven gear, with the driver gear rotating at constant velocity, can be graphically represented by a plot of the changing velocity ratio between the two gears, against the constant angular displacement of the driver gear.

$\theta_{DR}$—co-ordinate

R—ordinate

The apportionment, of the pitch profiles of the driven/driver gear combination, that cause the kinematic gyrations in the rotation of the driven gear, may be specified in relationship to angular displacement, as they relate to the displacement of the driver gear, by differentiation and integration of the relationship of R with respect to $\theta_{DR}$ The first derivative $$dR/d\theta_{DR}$$

providing the relationship of angular acceleration on the driven gear against displacement of the driver gear.

The second derivative $d^2R/d\theta_{DR}$ providing the relationship of onset of acceleration on the driven gear against displacement of the driver gear, and The integral $$\int \left[ R \cdot \sqrt{DR}^{t + \frac{at^2}{2}} \right]_{t0}^{t1} \right]_{t1}^{t2} \right]_{t2}^{t3} \right]_{t3}^{tn} \cdots \right]_{tn}^{tn+1}$$

providng the angular displacement of the driven gear in relationship to that of the driver gear. Acceleration is assumed to be constant in the gyrations of the driven gear in the above expression of angular displacement. Acceleration is variable in respect to certain gyrations in the kinematic velocity pattern of the driven element of this technology; these are identified in the next paragraph.

Matching pairs of variable ratio spur gears, having embodiments in their profiles consistent with the requiremenets of square-wave generator elements, are described as pairs of spur gears that produce transistory periods, in the kinematic velocity pattern of the driven gear, with prolonged constant acceleration and minimum constant velocity at maximum amplitude, above and below the average cyclical velocity of the driven gear. The graph of FIG. 5 shows the general locus of the ratio R for generator elements that have profiles consistent with these requirements; sections (c) and (g) of the locus of the curve of FIG. 5 where acceleration is constant, sections (a) and (e) where velocity is constant, and sections (b), (d), (f) and (h) where acceleration is variable. The graph of FIG. 5 shows the kinematic velocity pattern of the negatively sloped spur gear square-wave driven element of FIG. 1. Application of the principle of kinematic reversal to the graph of FIG. 5, would provide the graph of the positively sloped spur gear square-wave driven element of FIG. 1.

FIG. 6 shows the basic lay-out of a mechanical square-wave generator. The fixed driver gear 3, and the fixed static element of the control mechanism 2, are affixed to the input shaft 1. Mounted between the affixed driver gear and static element and free to rotate on the input shaft, is the command driver gear 5, and affixed movable element of the control mechanism 4. The compounding control element 6, compounds the latter pair of elements to the former at any relative angle. The adjacent parallel shaft 12, is affixed to the differential carrier 11, and pinion 13, secured by nut 14. Mounted, free to rotate on the parallel shafts and in mesh with pinions 13, are the differential bevel gears 8, and 10, with the fixed driven gear 7, and command driven gear 9, affixed as shown.

With the input shaft rotating at a constant velocity, and the driver gear compounded at any specific angle, the instantaneous velocity of the differential carrier, in relation to the displacement of the input shaft, can be solved by the following expression:

$$R/\text{carrier} = \frac{R \text{ (Fixed)} + R \text{ (Command Driven Gears)}}{2}$$

FIG. 9 shows the relative velocity pattern of both the fixed (positive slope) and command (negative slope) driven gears, and the differential carrier of the square-wave generator of FIG. 6, with the generator elements having the profiles of FIG. 1 and the driver gears compounded at the In-phase Datum. The instantaneous value of R/carrier remains at unity throughout the cycle, since half the sum of the values of R for the driven gears is always unity. Any change in the angle that compounds the two driver gears would alter the relationship between the kinematic velocity patterns of the two driven gears, and subsequently produce a sinuous kinematic velocity pattern of the differential carrier.

The locus of FIG. 5 can be made to represent the kinematic velocity pattern of any spur gear square-wave driven element, applicable to the technology of this disclosure, by changing the co-ordinate and ordinate scales in respect to the sections of the locus as specified, and maximizing the essential features expressed by the first and second derivatives of the relationship of R with respect to $\theta_{DR}$.

By changing the value of the ordinate $\theta_{DR}=270°$ to $\theta_{DR}=180°$, the locus of FIG. 5 would represent the kinematic velocity pattern of the symmetrical profile of the driven element of FIG. 2. Similarly the locus of FIG. 5 can be made to represent the kinematic velocity pattern of the unsymmetrical, biased profile of the driven element of FIG. 3. By applying the principle of kinematic reversal to the single pair of driven/driver spur gears of FIG. 2, and FIG. 3, the cyclical relationship of the negatively and positively sloped differentially mounted driven gears of both combinations would be as shown in the graphs of FIG. 8, and FIG. 7. The kinematic velocity pattern of the differential carriers, again, being half the sum of the instantaneous values of R, in reference to the displacement of the driver gears. The velocity patterns of the carriers of the differentials of both FIG. 8, and FIG. 7, represent the condition when the driver gears are compounded such that the Periods of the differential carrier are at unity. It should be noted that the kinematic velocity pattern of the differential carrier in FIG. 7, the unsymmetrical, biased generator elements of FIG. 3, does not remain at unity throughout the entire cycle of the gyrations of the driven gears, as is the case for the generator elements of FIG. 1, and FIG. 2, since the sum of the instantaneous values of R does not remain constant during the whole cycle in the latter case.

The instantaneous value of R for the driven gear, in relation to the angular displacement of the driver gear, can be expressed as the instantaneous ratio of the pitch circle radius of the driver gear, to that of the pitch circle radius of the driven gear (the inverse ratio of their radii = R)

$$R = \frac{\text{Rad. PC Dr.}}{\text{Rad. PC Dn.}}$$

further, since the centre distance of driven/driver generator elements is constant, the relationship of the respective radii of the driven/driver combination is as follows:

$$\text{RAD. PC D}_N. + \text{RAD. PC D}_R. = l$$

by algebraic addition of the two expressions, and rearrangement, the following relationship between the respective instantaneous pitch circle radii, R, and the centre distance $l$, can be stated as $$\text{Rad. } PC\ Dn. = \frac{l}{R + 1} \quad (1)$$

-continued
$$\text{Rad. } PC\ Dr. = \frac{lR}{R+1} \quad (2)$$

Since R has both a maximum and minimum value in the kinematic velocity pattern of all driven generator elements, by substitution of these values in equation (2), and assigning $l$ a value of unity, a non-dimensional ratio of the maximum to minimum pitch circle radii will specify all driven/driver spur gear generator elements having the same ratio of maximum to minimum rotation in the kinematic velocity pattern of the driven gear, irrespective of the actual dimensions of the gears. This ratio is defined as the A/B Ratio of spur gear square-wave generator elements, and expresses a pitch circle profile perculiarity in the specification of such gears. It should be noted that the A/B Ratio applies equally to spur gear square-wave generator elements of different Cyclical Ratios.

Since the periods of constant velocity in the gyrations of the driven gear are related to the angular displacement of the driver gear, represented graphically by the peak and trough of the locus of the ratio R, graphical symmetry relates directly to the actual angle between the maximum and minimum radii as they exist on the pitch circle profile of the driver gear. Accordingly, Asymmetry Ratio expresses a pitch circle profile peculiarity in the specification of all driven/driver spur gear square-wave generator element, and is the maximum subtended angle between the peak and trough divided by the subtended angle of the cycle of the repetitive patterns. Accordingly, Asymmetry Ratio applies equally to spur gears of different Cyclical Ratios, since by definition Asymmetry Ratio is related to the pattern cycle of the driver gears.

The specification of Bias Ratio, of spur gear square-wave generator elements, is a measure of the symmetry of the maximum and minimum kinematic velocity of the driven gear about its average cyclical velocity, and expressed as the displacement of the average of the peak, and trough values of R from the In-phase velocity condition; which can be either positive or negative in displacement. The effects of Bias on the profiles of driven/driver square-wave generator elements is to alter congruous sectors such that they become common spur gear sectors, which alleviate pronounced irregularities in the profiles.

The specification of Cyclical Ratio and Cycle Ratio are self-explanatory and are defined in the Glossary of Terms.

The foregoing discussions affirm the endless number of possible variable ratio spur gear profiles that have direct application to the square-wave generators of this technology, and institutes criteria that can specify the profiles in terms of embodiments that are claimed as properties of privilege. The scope and ramification of these properties are exposed in the following series of drawings in which FIGS. 10 to 22, FIGS. 23 to 25, and FIGS. 26 to 33, show the changing kinematic velocity pattern of the differential carrier of variable ratio spur gears having the three basic profiles of FIG. 1, FIG. 2 and FIG. 3, as the compounding angle between the driver gears is changed such that the amplitude of the Periods of constant velocity vary from a maximum 1.3X, to a minimum 0.7X that of the average velocity of the driven gears for FIGS. 1 and 2, and from a maximum of 1.35X to a minimum 0.85X that of the driven gears of FIG. 3.

Specific embodiments of A/B Ratio, Asymmetry Ratio, Bias Ratio, Cyclical Ratio, and Cycle Ratio on the pitch circles of the generator element is arbitrary. The graphs of FIGS. 37, 38 and 40 show respectively the relative value of Duty Cycle, Required Phase Shift and Ratio of max/min Periods as a function of Asymmetry Ratio with Generated Periods of 1.3X cyclical velocity of the driver gears of a generator. Graph, FIG. 39, shows the Period range as a function of Duty Cycle with the specific generator elements of FIGS. 1, 2 and 3 incorporated in a generator. Graph, FIGS. 41 and 42 show the result of varying A/B Ratio and Bias Ratio on the Ratio of max/min Periods that are generated with a Minimum Duty Cycle of 108°.

Thus far in the discussion of spur gear square-wave generator elements, the embodiments of privileged disclosure have dealt with the pitch circle profile of such gears. The ratio of teeth to voids on the respective elements in accordance with the following formulae;

$$\text{Driven Gear} = \frac{x+y}{x} \quad \frac{\text{Teeth}}{\text{Voids}}$$

$$\text{Driver Gear} = \frac{x}{x+y} \quad \frac{\text{Teeth}}{\text{Voids}}$$

(where $y$ is an increment of added thickness falling within the range 1x, to zero $x$ the normal tooth or void thickness), such that the centre of the oversized void falls on the minimum radius of the driver gear, which, respectively places the centre of the oversized tooth on the madimum radius of the driven gear. This embodiment provides for a tooth of greater strength and eases the manufacturing problems of such gears FIG. 4 shows the lay-out of teeth on the driven/driver generator elements of FIG. 1 using the above formulae when $y$ equals 1.

In the following disclosure, of the kinematic lay-outs of simple transmissions, only one inverted gear train loop is depicted. The arguments advanced in the discussion are predicated on the presence of four inverted gears trains, spaced evenly about the common driver Generator Elements and driven take-off gear, with the In-phase relationship of the Generator Elements as shown in FIG. 34, with items 3 and 5 being respectively the fixed and command driver gears, and items 7 and 9 being the driven gears of the basic square-wave generator as shown in FIG. 6. Further, unless otherwise stated, the profiles of the Generator Elements are those of FIG. 2, with the changing cyclical pattern of the differential carriers as shown in FIGS. 23 to 25. The relative kinematics of the individual components of the different lay-outs are shown in FIG. 59, with Graph (A) showing the In-phase condition for all lay-outs, and the remaining Graphs showing the kinematics for each of the different lay-outs when Translation is maximum, with the Periods having 90° Duty Cycles as shown in FIG. 35. FIG. 59 will be referred to in the discussions of the different lay-outs.

Figure 43:
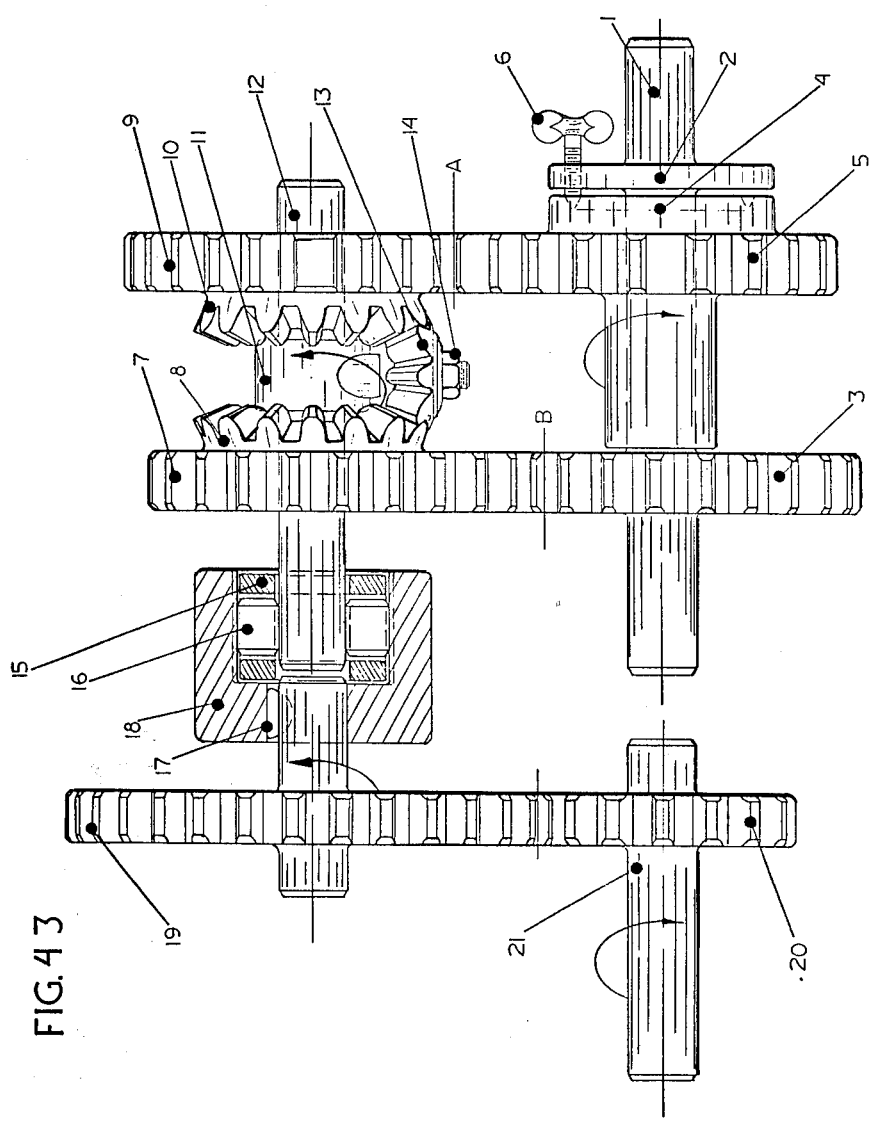

FIG. 43 shows the basic lay-out of a simple transmission with the square-wave generator components identified in accordance with the description of the basic generator of FIG. 6, the cage of the overrunning coupling 15, the coupling rollers 16, the coupling outer race 18, affixed to the shaft of the driver take-off gear 19, by the key 17, and meshing with the driven take-off gear 20, affixed to the output shaft 21.

With the driver gears at the In-phase condition, rotation of the differential carrier 11, and shaft 12, would remain constant with that of the driver gears and input shaft, as shown by their kinematic relationship in Graph (A) of FIG. 59. The driven take-off gear 20, would rotate 2X the speed of the input shaft (Take-off Ratio = 2). The kinematic continuum between the input and output shafts would be shared equally by all four inverted gear trains, in the transmission of the external torques.

By changing the relative angle between the command and fixed driver gears so that the Periods are 1.25X the In-phase velocity, the Duty Cycles would be 90°, and the sequence of the Periods being generated in the four Generators would be as shown in FIG. 35. Accordingly, the driven take-off gear would rotate 2.5X that of the input shaft, and the kinematic continuum between the input and output shafts would be cyclically assigned to each of the four inverted gear trains for 90° rotation of the driver gears and input shaft. The overrunning couplings, coupling when the velocity of the differential carriers and counter shafts are equal to the continuum speed of the driver take-off gears, with uncoupling occurring when the speed of the rotating counter shafts falls below the continuum speed. This is shown in Graph (B) to FIG. 59, where the pattern of rotation of the differential carrier 11, and 12, and the driver take-off gear 19, rotate in unison. It follows that the Translation Ratio of the output shaft is infinitely variable over the range of 2X to 2.5X the speed of the input shaft, and directly proportional to the change in the angle that compounds the fixed and command driver gears to the input shaft.

By substituting the Generator Elements of FIG. 43 with those of FIG. 1, some overlapping of the Periods would occur as shown in FIG. 11, or with a 90° Duty Cycle, translation of the output shaft would be 2.6X that of the driver gears, as shown in FIG. 36. By substituting the Generator Elements with those of FIG. 3, an irregular kinematic continuum through the transmission would occur for some settings of the compounding angle of the driver elements, as shown in FIG. 30 and FIG. 31. The characteristics of steady translation through a simple transmission as described, using overrunning couplings, dictates that the Generator Elements have no Bias, unless the kinematic continuum is limited to those relative phase angles of the driver elements where the velocity of the carrier does not exceed the Periods, i.e. FIGS. 26 to 29.

Figure 44:
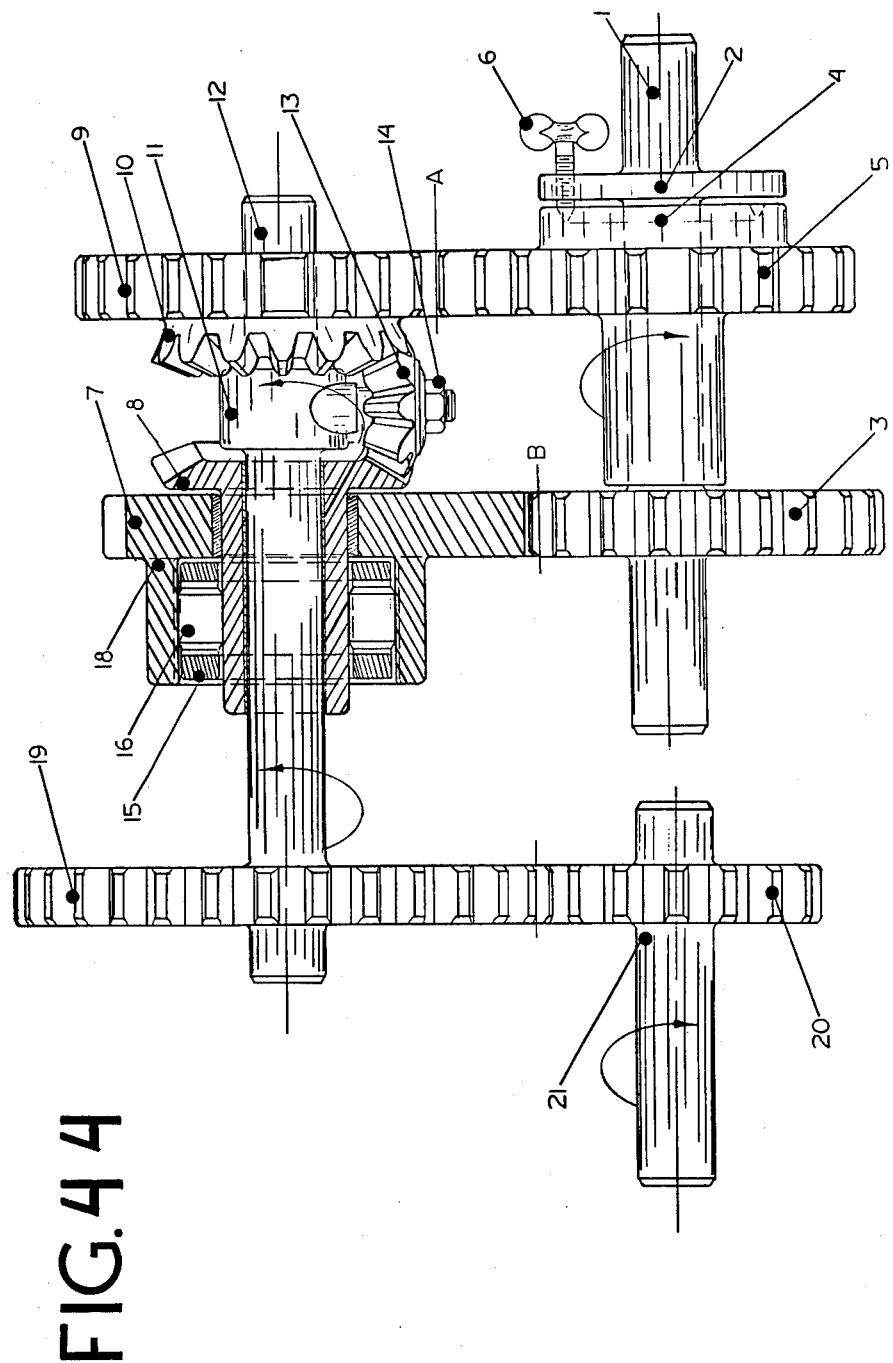

FIG. 44 shows a variation of the simple transmission of FIG. 43, in that the overrunning coupling units are placed between the fixed driven gears 7, and the bevel gears 8, rather than on the counter shafts. This variation extends the counter shafts 12, so that the driver take-off gears 19, can be affixed to them. This arrangement ensures that the counter shafts and differential carriers always rotate at the steady kinematic continuum speed, with the bevel gear 8, cyclically uncoupling from the fixed driven gear 7, when it does not rotate in unison with it, i.e. a Period is not being generated. Graph (D) of FIG. 59 shows the kinematics of the relative components with the differential carrier 11, counter shaft 12, and driver take-off gear 19, rotating at the continuum speed, and the rotational pattern of the bevel gear 8, rotating in unison with the fixed driver gear 7, when a Period is being generated; with independent rotation of the bevel 8, greater than that of the driver gear 7, during the remaining portion of the cycle. The Translation Ratio of the output shaft is uneffected by the variation and remains the same as for the transmission of FIG. 43. The advantage of this variation is that the loads on the coupling units are halved, and the relative motion of the coupling action is greater.

Figure 45:
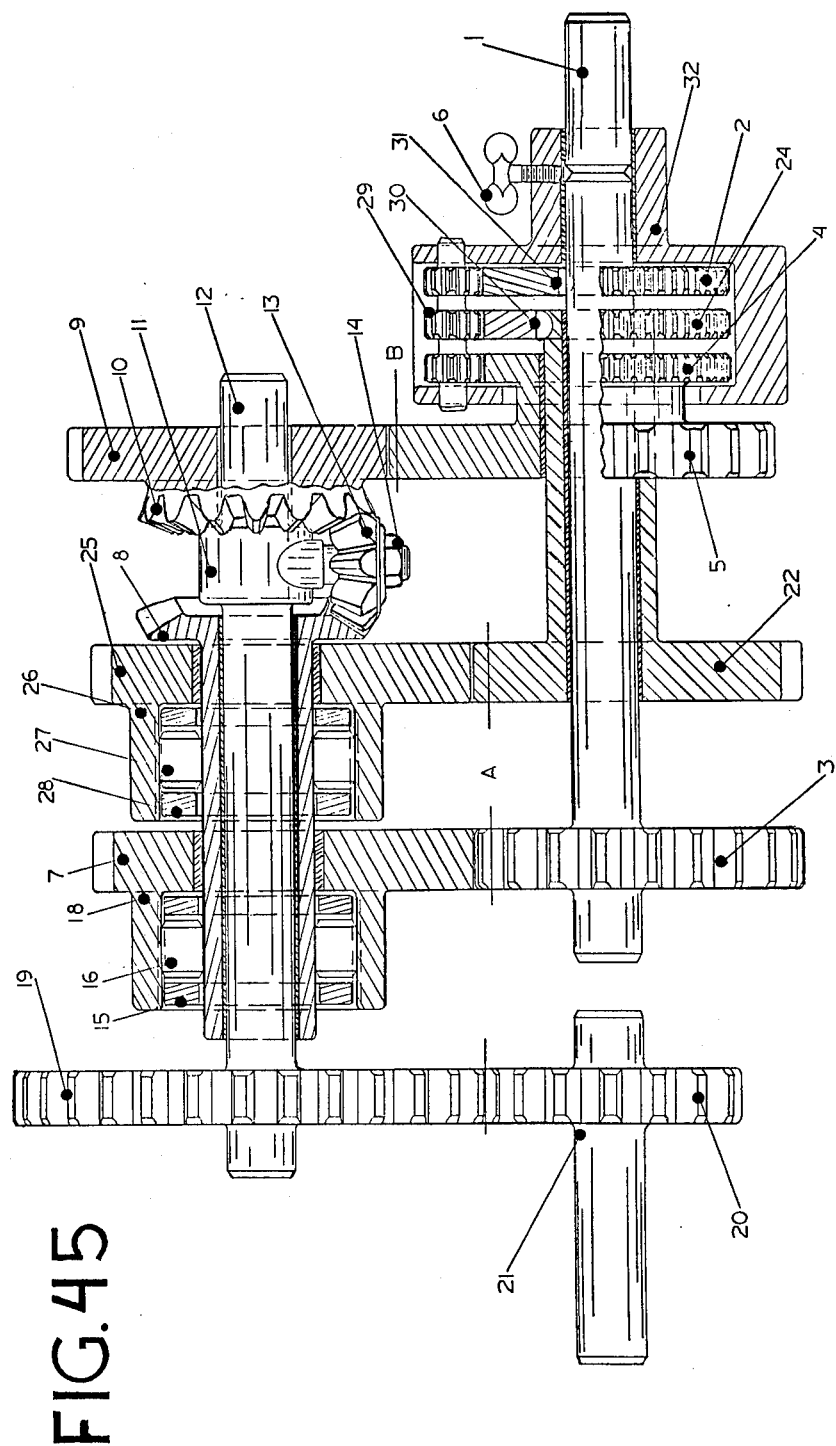

FIG. 45 shows the basic lay-out of the transmission of FIG. 44, with a second bank of command driven gears 25, and driver gear 22, and a second movable control element 24. The input shaft 1, has affixed to it, the fixed driver gear 3, and the fixed control element 2, secured by key 31. Co-axially mounted on the input shaft, and free to rotate is a second command driver gear 22, movable control element 24, secured by key 30. Co-axially mounted on the extended shaft of the second command driver gear 22, is the command driver gear 5, and affixed movable control element 4, with all control elements consisting of gears with the same numbers of teeth. Congruent to the three control elements is a three spool gear 29, with congruent gear to control element 24 with one less tooth and congruent gear to control element 2 with one more tooth than the congruent gear of the spool to control element 4. The three spool gear 29 is mounted in the control cage 32, which is free to rotate on the input shaft 1. The compounding control element 6, compounds the control cage 32, to the input shaft 1, at any relative rotary position. The second command driver gear 22 is congruent to the third bank of command driven gears 25, which are free to rotate on the extended shaft of the differential bevel gears 8, and have affixed to them the outer race of an overrunning coupling 26, and coupling rollers 27, and coupling cage 28, oriented to transmit torque to the extended shaft of the bevel gear 8. The In-phase relationship of the driver gear is such that the cyclical pattern of gyration of the second bank of command driver gears 25, and the bank of fixed driven gears 7, are in unison with each other, with the first bank of command driver gears as shown in Graph (A) of FIG. 59.

With the driver gears at the In-phase condition, rotation of the differential carriers 11, and shaft 12, would remain constant at the same velocity as the input shaft, as shown in Graph (A) of FIG. 59, and the driven take-off gear 20, would rotate 2X the speed of the input shaft, with the kinematic continuum again being shared equally by all four inverted gear trains. To change the relative phase angle between the fixed driver gear 3, and the two command driver gears 22 and 5, the compounding element 6, is freed and the control cage 32, is rotated on the input shaft 1. The decreased number of teeth on the congruent spools of the three-spool gear 29 from element 2 to element 4 to element 24 causing a relative axial displacement of the two command gears, for every rotation of the three-spool gear 29, as caused by the rotation of the cage about the input shaft, an amount equal to the subtended angle of one tooth of the control elements 2 and 24, respectively ±, relative to the relatively fixed control element 4. It should be noted that if the number of teeth on the control elements is large, control sensitivity is small, and control elements having teeth that number around one hundred would remain locked, because of the frictional forces, and the compounding element 6, would be inconsequential.

Graph (E) of FIG. 59 shows the kinematic relationship of the driven elements of the transmission lay-out of FIG. 45, with the command driver gears 9, and 25, rotated 90° and 180°, respectively, from the In-phase Datum. From Graph (E) it can be seen that the kinematic continuum of the differential cage 11, counter shaft 12, and driver take-off gear 19, is 1.25X that of the input shaft as in the previous discussions, however, the Duty Cycle of the Periods is 180° rather than 90° as with the previous transmission lay-outs. The 180° Duty Cycle results from bevel gear 8 rotating in unison with fixed driven gear 7, for 90° rotation of the driver elements, and in unison with command driven gear 25, for the remaining 90° of the Period Duty Cycle. Accordingly, kinematic continuum through the transmission of FIG. 45 requires only two inverted gear train loops to achieve the same translation of input, as compared to four loops for the transmission lay-outs of FIG. 43 and FIG. 44. With four inverted loops the transmission of FIG. 45 would be capable of a greater Translation of input conditions than as shown in Graph (E) of FIG. 59.

Figure 46:
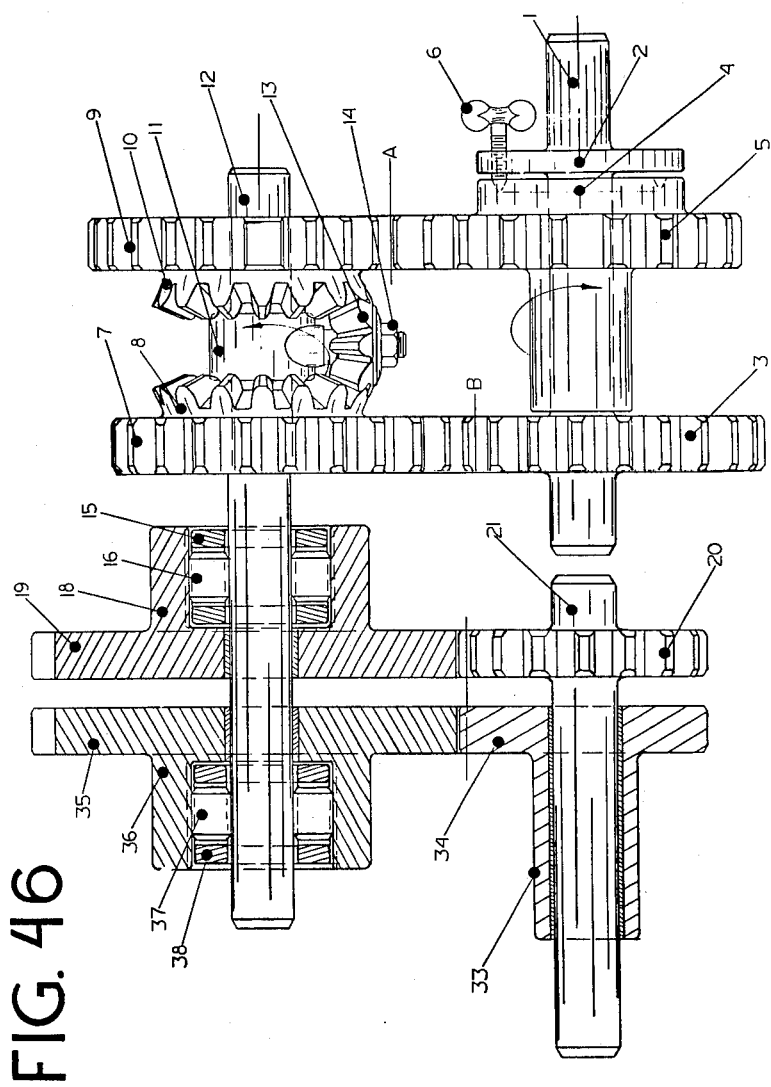

FIG. 46 shows the same basic lay-out of FIG. 43 except than an additional bank of driver take-off gears 35 are mounted on the counter shafts 12, with affixed coupling outer races 36, coupling rollers 37, and coupling cages 38, so oriented that they transmit torque to the counter shafts 12, and are congruous to a second driven take-off gear 34, and affixed shaft 33, mounted concentrically and free to rotate on the output shaft 21. The second driven take-off gear 34, and affixed shaft 33, are designated the input element to the transmission in the simple series lay-out of FIG. 46, with shaft 1, and affixed driver gear 3, and control element 2, designated the control shaft.

With the driver gears compounded at the In-phase condition rotation of the input shaft 33, and the output shaft 21, would be in unison, as output Translation would be 1X input velocity, since both Take-off Ratios are equal to two. The kinematic continuum between the input element 34, and output element 20, being through the abridged loops formed by the driver take-off gear 35, and affixed overrunning coupling assemblies 36, 37, and 38, transmitting input torque to the counter shafts 12, and driver take-off gears 19, and affixed overrunning coupling assemblies 18, 16, and 15, accepting input torque from the counter shafts 12, and transmitting the input torque to the driven take-off gear 20, with the generator differential carriers and associated gear elements effectively disengaged from the kinematic continuum.

With the driver gears compounded such that the Periods being generated are cyclically 1.25X and 0.75X the velocity of the control shaft 1, and affixed driver elements, the kinematic relationship of the relative components would be as shown in Graph (C) of FIG. 59, with the 1.25X Periods designated as +P and the 0.75X Periods designated as −P. The simple series configuration of FIG. 46, utilized both cyclically transient Periods being generated by the symmetrical Generator Elements in the kinematic continuum through the transmission, with the +P coupling to the bank of driver take-off gears 19, and the −P coupling to the bank of driver take-off gears 35, with output Translation being 1.67X input velocity. The kinematic continuum being cyclically assigned to each opposite combination of the four inverted gear trains for 90° rotation of the driver gear and control shaft, as each half of the combination alternates between a normal and reverse torque pattern as the +P and −P are being alternatively generated in the respective combination. Again, it follows that the Translation Ratio of the output shaft is infinitely variable over the range of 1X to 1.67 X the speed of the input shaft, and directly proportional to the change of the angle that compounds the fixed and command driver gears of the square-wave generator.

FIG. 47, shows the basic lay-out of the simple transmission of FIG. 43, with an added differential amplifier consisting of an epicyclic gear train of the common bevel gear type, with the driven take-off gear 20, compounded to one of the co-axial bevel gears 39; and the input shaft 1, extended such that the epcyclic carrier 40, and pinion 41, secured by nut 42, are affixed as shown. The second bevel gear 43, being affixed to the designated output shaft of the transmission 44.

With the driver gears of the square-wave generators at the In-phase condition, rotation of the driven take-off gear 20, and affixed bevel gear 39, would be 2X that of the input shaft 1, and affixed epicyclic carrier 40; with the second bevel gear 43, and designated output shaft 44, having no rotation. With the driver gears compounded such that Translation of the driven take-off gear 20, is 2.5 X that of the input shaft 1, the designated output shaft will rotate 0.5X that of the input shaft in the reversed sense. The torque forces on the input shaft, which are transmitted through the inverted gear trains in the normal sense, are the sum of the external input torque and the torque on the affixed epicyclic carrier, with Translation of input dynamics, to the output shaft, infinitely variable over a Translation Ratio of input to output velocity, from −2 to infinity, and is a logarithmic function of the change in the angle that compounds the driver gears over the range of Translation.

By reversing the orientation of the overrunning couplings of the Transmission of FIG. 47, such that they transmit torque to the counter shafts rather than accept torque from them, the Translation Ratio in the loops are subject to those Periods at or below Cyclical Ratio of the Generator Elements, rather than those Periods at and above, as is the case when a normal torque pattern is present in the loops. Accordingly, Translation of the driven take-off gear 20, would vary from 1.5X to 2X the velocity of the input shaft, and Translation of Input dynamics to the output shaft 44, would be infinitely variable over the Translation Ratio of input to output velocity, from +2 to infinity, with the torque forces on the epicyclic carrier, affixed to the input shaft, being the sum of the external input torque, and the torque on the epicyclic bevel gear 39, which is transmitted through the inverted gear trains in the reverse sense, to the fixed and command driver gear 3, and 5, affixed directly and indirectly to the input shaft. The Translation Ratio of input to output velocity again, relating to the change in the compounding angle between the two driver Generator Elements as a logarithmic function.

FIG. 49 shows the same basic lay-out of the transmission of FIG. 47, with the overrunning couplings replaced by externally activated couplings, consisting of a single disk 47, affixed to the counter shafts 12; with the fixed pressure plate 45, movable pressure plate 48, locating and holding pins 46, compression springs 49, uncoupling balls 50, and uncoupling ring 51, affixed to the extended shaft of the driver take-off gears 19. Congruent to the uncoupling rings 51, is the common uncoupling cam 52, fitted to the input shaft 1, by key and keyway 53, with axial movement towards and away from the fixed driver gear 3, caused by the push-pull rod 54, with free passage through the fixed driver gear, as the affixed follower 56, and retaining nut 55, are moved congruently with the cylindrical cam 57, on the extended section of the command driver gear 5. The profiles of the Generator Elements being those shown in FIG. 1, with the maximum and minimum Periods as shown, respectively, in FIG. 10 and FIG. 22.

With the driver gears of FIG. 49 compounded such that they are at the In-phase Datum, with the relative position of the driven/driver Generator Elements as shown, the instantaneous position of the incident line, in reference to the beginning of the Period in the cycle of the fixed driver gear, would fall on the axis of the differential carrier of the Generator shown, with the uncoupling ring 51, and uncoupling balls 50, being forced against the conical cavities in the fixed and movable pressure plates 45 and 48, thereby forcing the pressure plates apart and preventing congruency with the disk 47, and counter shaft 12. As rotation continues the uncoupling ring is allowed to center by the uncoupling cam and congruency through the loops is cyclically sequenced to the 270° Duty Cycle Period being generated in the Generator. FIG. 57 shows the graphical lay-out of the uncoupling cam with the incident line as described, falling on the 0° reference of the cam, and the co-ordinate value L relating to the movement of the follower 56, in the cyclindrical cam 57, as the command driver gear is rotated in a positive and negative sense, relative to the fixed driver gear, so that the increasing and decreasing Periods that are generated, are correlated to the increase in the subtended angle of the lobes on the uncoupling cam. The kinematic continuum through the transmission would be as described in FIG. 47, and the Translation Ratio of input to output velocity would vary from $-1.67$ to infinity to $+1.67$; the output shaft being a bidirectionally rotating element.

FIG. 50 shows the same basic lay-out of the transmission of FIG. 49, with the epicyclic gear train so proportioned that shaft 44, and affixed pinion 43, are designated the input elements to the transmission, and shaft 1, and affixed epicyclic carrier 40 are designated the output element to the transmission. This arrangement ensures that the output shaft is a unidirectionally rotating element that cannot be made to translate to the infinite input to output ratio. Further, the value of torque in the inverted gear train loops are a function of input torque and independent of the Translation Ratio through the transmission. For the purposes of this discussion, the Take-off Ratio and Epicyclic Ratio (Pr/R) are 1.3 and 5.6, respectively. Accordingly, the Translation ratio of input to output velocity would vary from $+1$ to $+3.5$.

The foregoing analysis affirms the maximum and minimum Translation Ratios through the transmission of FIGS. 49 and 50, for specific values of Take-off Ratio and Epicyclic Gear Train Ratio, with the maximum and minimum Periods respectively at 1.3X and 0.7X the Cyclical Ratio of the Generator Elements. FIGS. 51, 54, 55 and 58, graphically portray the effects of changing the respective Take-off Ratios (TOR) and Epicyclic gear Train Ratios (Pr/R) will have on the range of velocity translation through the transmissions of FIGS. 49 and 50. FIG. 52, graphically portrays the ratio of torque in the inverted gear trains to input torque $T_F/T_{IN}$ for the transmissions of FIGS. 49 and 50. FIG. 53 graphically portrays the frequency of the coupling action of the programmed couplings of FIGS. 49 and 50, as a function of the Translation Ratio through the transmission. FIG. 56 graphically portrays the theoretical mechanical efficiency ($\epsilon$) of the transmissions of FIGS. 49 and 50, as a function of the Translation Ratio, with the loss of efficiency calculated on the basis of 0.5 to 1 percent of the mechanical energy transmitted between the adjacent kinematic elements during one revolution of the input elements. It follows that by substituting the Generator Elements of FIGS. 2 and 3 in the transmission layouts of FIGS. 49 and 50, together with appropriately profiled uncoupling cams 52, they will perform equally satisfactorily, and therefore, the characteristics of steady translation through the drive train of a transmission incorporating programmed coupling units does not require that the Generator Elements have no Bias as is the case for a transmission incorporating overrunning coupling units as discussed previously.

FIG. 48 shows a complex series transmission lay-out with added spur epicyclic gear train. The input shaft 1, has the fixed driver gear 3, and the fixed control element 2, and key 31, affixed as shown, with the command driver gears 5 and 22, together with their respective control elements 4 and 24, attached and both free to move co-axially mounted on the input shaft 1. The three spool gear 29, held in the control cage 32, and compounded to the input shaft by control lock 6. Differential cage 11, together with bearing caps 14, double pinions 13, and 62, together with retaining tapered cups 114, to which is affixed spur gear 85, which meshes with spur gear 86, which is free to rotate on input shaft 1, and meshes with gear 85B of the second complex inverted gear train of the transmission, (only one of the two 180° oppositely places inverted gear trains is shown) and free to rotate on the counter shaft 63, to which is affixed the differential bevel gear 64, and the two command driven gears 67 and 68, together with their respective overrunning coupling units 87 and 88, so oriented that they accept torque from the counter shaft 63. Co-axially mounted on counter shaft 63, is the second bevel gear 65, to which is affixed the fixed driven gear 66. Co-axially mounted on the shaft of the second bevel gear is bevel gear 8, to which is affixed fixed driven gear 7. Co-axially mounted on the extended portion of counter shaft 63 is bevel gear 10, together with the two command driven gears 9 and 25, and their respective overrunning coupling units 16 and 27, so oriented that they transmit torque to the bevel gear 10. Co-axially mounted on the input shaft 1, and free to rotate, is the second fixed driver gear 71, to which is affixed the fixed control element 72, together with epicyclic spur gear 80. Co-axially mounted on the second fixed driver gear 71, are the command driver gears 69 and 70, together with their respective movable control elements 73 and 74, with a three spool spur gear 77, mounted in control cage 78, and held to fixed control gear 71, by control lock 79. Attached to the output end of the input shaft 1, is the second epicyclic spur gear 83, with both spicyclic spur gears meshing as shown with the compounded spur pinions 82 and 81, mounted on the epicyclic cage 84, which is the output element to the transmission. Control elements 24 and 73, have two less teeth than control elements 4 and 74, and control elements 2 and 72, have one less tooth than control elements 4 and 74. The epicyclic ratio between gear 80 and 81, and 83 and 82, being respectively one and .6.

With the complex square wave generators of FIG. 48, such that both the respective torque transmitting and torque accepting halves, with respect to the co-axially mounted driver gears, at the In-phase Datum, epicyclic gears 80 and 83, together with compound gears 81 and 82, together with epicyclic cage 84, will all rotate in unison and the Translation Ratio of input to output through the transmission will be $+1$. With the command driver gears 4 and 24, and 73 and 74 rotated $+$ and $-90°$ respectively from their fixed driver gears 3 and 71, the differential cage 11, would rotate at 1.25X the speed of the input shaft 1, as previously disclosed in conjunction with Graph (E) of FIG. 59, or as indicated by the Graph of Loop 7-8, split 180°, of FIG. 62, and the driver gears 71, 70, and 69, of FIG. 48, would be subject to the Graph of Loop 7A-8A of FIG. 62A, such that the rotation of epicyclic spur gear 80, would be 1.67X that of the input shaft and affixed epicyclic spur gear 83, with the result that the epicyclic cage 84, would rotate 2.67X that of the input shaft 1. It follows that the Translation Ratio of input to output through the transmission of FIG. 48, will vary infinitely over the range of +1 to +0.374. Now, since the driver gears 69, 70, and 71, become effectively the driven take-off gears of the complex inverted gear trains, kinematic continuum through the inverted gear trains cannot be maintained without the addition of spur gears 85 and 85B, together with idler spur gear 86, since the Periods are related to the angular displacement of the driver elements and the driver elements of each half of the complex loops only rotate in unison when they are at the In-phase Datum.

FIG. 60 shows a simple series transmission lay-out with four inverted gear trains of the type illustrated in FIG. 45, such that loops 7-8, and 7-8B, have their overrunning couplings so oriented that they transmit torque to their respective command driven gears, and loops 7-8A, and 7-8C, with their overrunning couplings so oriented that they accept torque from their respective command driven gears. The lay-out of FIG. 60, shows one half of each 180° opposite pair of inverted gear train loops, with FIG. 61 showing the true relationship of the opposite pairs of counter shafts, together with the pitch cylinders of their respective take-off gears and the pitch cylinders of the epicyclic differential amplifier. Affixed to the control shaft 1, is the fixed driver gear 3, with the shaft extended and supported by driven take-off gear 34. Also affixed to the control shaft 1, is the fixed gear control element 2, and key 31, with the control motor armature 104, keyed to the control shaft at 107, such that they rotate together. Affixed to the control cage 32, is the control motor field windings 103, such that they rotate together, with suitable slip rings and terminals 105 and 106, mounted on the transmission rear housing 112, and connected electrically such that the control motor field 103, together with the control cage 32, can be made to rotate about the control shaft 1, in either direction. The control shaft is mounted in the rear cylindrical housing 111, and center cylindrical housing 109. Mounted on the control shaft and free to rotate are the command driver gears 22 and 5, together with their respective movable control elements 4 and 24 appropriately affixed with the same number of teeth on the control element 2. Congruent to the three control elements is a three-spool gear 29, with congruent gears to control element 24 with one less tooth, and congruent gear to control element 2 with one more tooth than the congruent gear of the spool to control element 4. The three spool gear 29, is mounted in the control cage 32, which is free to rotate on the control shaft 1, with the control motor field windings 103. The input shaft 44, having affixed to it by key 100, the epicyclic spur gear 43, and the driven take-off gear 34, with driver take-off gear 35 and 35B affixed to counter shafts 12 and 12B, by keys 102, and driver take-off gears 19A and 19C respectively affixed to the counter shafts 12A and 12C, by key 101, such that they mesh with combination epicyclic ring gear and driven take-off gear 20-39. Item 40, the epicyclic cage is co-axially mounted on the input shaft 44, and is designated the output element to the transmission with pinions 41 of the epicyclic gear train mounted in cage 40 as shown, and held by the transmission front housing 110. The fixed driven gear 7 is keyed to differential bevel gear 8, and command driven gears 25 and 9, together with torque transmitting overrunning couplings 27 and 16, mounted on differential bevel gear 10, together with differential carrier 11, and pinion 13, with bearing cap 14, and retaining tapered cone 114. The Take-off Ratios and Epicyclic Ratio are, respectively, gear 35 or 35B, to gear 34, one; gear 19A or 19C, to compound ring gear 20-39, 2.67; and epicyclic gear 43, to ring gear 20-39, 1.85. Rotation of the elements is as shown in FIG. 61, with the kinematics of the square-wave generator components for different phase shifts as shown in FIGS. 62, 62A, 62B and 62C.

With the driver gears of transmission lay-out FIG. 60, at the In-phase Datum, and the input shaft 44 rotating, congruency through the simple series inverted gear trains from driven take-off gear 34, to compound epicyclic ring gear and take-off gear 20-39, would be such that gear 20-39, rotates in the reverse sense 0.374X that of the input, with the epicyclic cage 40, the output element of the transmission, therefore rotating +0.108X that of the input shaft, with the torque pattern on the take-off gears such that the weight shown in FIG. 61, would tend to rotate the input shaft. The kinematics of the inverted gear trains for all loops would be as shown by the In-phase Graphs of FIG. 62, or FIG. 62B. With the driver gears of transmission layout FIG. 60, at maximum Period generation as shown by the split 180°, Graphs of FIGS. 62, 62A, 62B and 62C, congruency through the simple series inverted gear trains from driven take-off gear 34, to compound epicyclic ring gear and take-off gear 20-39, would be such that gear 20-39, rotates in the reverse sense −0.625X that of the input, with the epicyclic cage 40, the output element of the transmission, therefore rotating 0.055X that of the input shaft with the torque pattern on the take-off gears such that the weight shown in FIG. 61, would be raised by the rotating input shaft. It follows, therefore, that the Translation Ratio of input to output through the transmission is infinitely variable over the range of +9.27, to infinity, to −18.18. The Graphs, Split 90° Loops 7-8, and 7B-8B show the intermediate stages of phase shift for the torque accepting loops. Corresponding kinematic Graphs have not been shown for loops 7A-8A, and 7C-8C, nor for the In-phase condition since it is not felt to be necessary.

FIG. 63 shows a simple transmission lay-out having two inverted gear trains of the type illustrated in FIG. 45, with added epicyclic differential amplifier and electric control motor as described in FIG. 60, with the following exceptions. The fixed control element, affixed to the output shaft 1, is a compound gear with elements 2A and 2B, such that 2A has one less tooth than command control element 24, and element 2B has one more tooth than control element 4, with both command elements 4 and 24 having the same number of gear teeth, and the control spool gears such that gear 29A, is congruent to command control element 4, and has an extended shaft with a suitably fixed spline such that spool gear 29C, is firmly affixed and congruent to fixed control element 2B, with both ends of the extended shaft mounted, free to rotate in the control cage 32A, and 32B, as shown. Mounted co-axially on the extended shaft of spool gear 29A, between spool elements 29A and 29C, and free to rotate is double spool gear element 29B, with one spool element congruent to command control element 24, and the second spool element congruent to the fixed gear element 2A. With rotation of the control cage 32A and 32B, with affixed motor field windings 103, command control elements 4 and 24 would rotate respectively the subtended angle of one tooth less and one tooth greater, for every complete revolution of the control cage 32A, and 32B, about the output shaft 1, and affixed motor armature 104. Attached to the driven take-off gear 20 is the ring gear of the epicyclic differential amplifier 39, shown as item 20–39 in FIG. 63. Attached to the output shaft 1, by key 115, is the epicyclic differential amplifier cage 40, together with pinion and pinion shaft 41. Co-axially mounted on the ouput shaft is input shaft 44, and affixed epicyclic spur gear 43. The take-off ratio of driver gears 19 or 19B, to driven take-off gear 20 is one, and the epicyclic ratio, spur gear 43, to ring gear 39, shown as item 20–39, is 3. The transmission drive train suitably mounted in front housing 110, center cylindrical housing 111, together with front bearing 116, and rear housing 112, attached to center cylindrical housing 110, by screws 123, and rear cap 108, affixed as shown. The remaining items being identified as in FIG. 60 with the overrunning coupling units 27 and 16 so oriented that they accept torque from the differential bevel gear 10.

With the driver gears at the In-phase Datum the input shaft 44, and affixed epicyclic gear 43, epicyclic cage 40, and the output shaft 1, all rotate in unison and the Translation Ratio of input to output is +1. With the driver gears at the 180° split phase condition as shown in Graph — Split 180°; Loop 7C–8C, and Loop 7A–8A, FIG. 62C, and FIG. 62A respectively, the Translation Ratio of input to output would be +1.75. It follows that the Translation Ratio of input to output would be infinitely variable between the ratios of +1 to +1.75, as a logarithmic function of the phase shift of the command driver gears 22 and 5, in respect to the fixed driven gear 3.

FIG. 64 shows a compound series transmission layout. The input shaft 20–39, is the epicyclic differential amplifier ring gear 39, and driven takeoff gear 20, suitably mounted in the front transmission casing 110. Concentrically mounted within the input shaft 20–39, is the output shaft 40, and affixed epicyclic cage of the differential amplifier, with pinions 41, and shafts 411 mounted as shown. Epicyclic gear 43 is compounded to driven take-off gears 34, shown as item 43–34, and free to rotate independently on the center axis to the transmission. The driver take-off gears 19 and 19B, meshing with input shaft gear 20, designated 20–39, and mounted with suitable bearings on the center casing plate 211, and incorporating torque transmitting overrunning couplings 119, together with torque accepting couplings 16. Co-axially mounted in the center transmission plate 211 are the driver take-off gears 35 and 35B, meshing with driven take-off gears 34, designated 43–34, and incorporating torque transmitting overrunning couplings 137, and torque accepting overrunning couplings 37. Mounted concentrically in the driver take-off gears 35 and 35B, and 19 and 19B is the double spool reversing shaft 210, such that the spools are respectively the inner races of the overrunning couplings to either overrunning couplings 37 or 137, and 16 or 119, but not both depending on the position of the reversing shaft which is held in the position as shown by spring 218, together with reversing piston 220, and circlip 223, affixed to the extended section of reversing shaft 210, which is splined to counter shaft and differential carrier 11-12. Differential carrier 11-12 having suitably mounted to it driven fixed gears and differential bevel gears 7-8 or 7-8B, and 9-10 or 9-10B as shown. The counter shafts and differential carriers 11-12 and 11-12B being mounted with suitable bearings in the center and end transmission plates 211 and 213. Congruent to the driven Generator Elements is the fixed driver gear 3, which is affixed to the control shaft 1, together with the fixed control element 2, held by key 31 with thrust bearing and circlip 204 and 203. Control shaft is extended, and affixed to it is the disk 226, key 227 and circlip 229, together with compression spring 226 and governor end cap 230, held to governor casing 217, by screws 216. Mounted on the control shaft 1 is the control shieve 206, together with thrust bearings 205 and 207, stationary control cone 222 and tapered neck of governor casing 217, all held by circlip 231. Affixed to the stationary control cone 222, are the holding and locating pins 224, mounted in the rear tapered casing 214 such that they move freely along the axis of the control shaft. Concentrically mounted on the control shaft 1 is the command driver gear 5, to which is affixed the movable control element 4, by key 122. Congruent to the control elements 4 and 2, and the double spool gears 29, such thay they are keyed to the square shaft of the running, double tapered control wheels 221, with their forward ends threaded such that they move along their axis when they are rotated because of the congruency of their threads to those of the control cage 32A. The extended square portion of the control wheel 220, having mounted on them thrust bearings 202, held in rear control cage plate 32B, and mounted to control cage 32A, by screws 120. Item 215 is the rear cover plate held to rear taper casing by screws 218. The kinematics of the transmission layout FIG. 64 is as shown in Graph (C) of FIG. 59, with the reversing shaft 210 as shown, and the takeoff ratios, and epicyclic ratios are respectively gear 19 or 19B, to gear 20–39, 3; gear 35 or 35B to gear 43–34, one; gear 43–34 to gear 29–39, 3. Compound loop 7–8A and 7–8C has not been shown.

With the reversing shaft 210 as shown, and rotation of the input shaft 20–39 such that the centrifugal forces on the control balls 225 are overcome by the control spring 229, the driver gears 3 and 5 would be held at the In-phase Datum, and epicyclic pinion 41, and driven take-off gears 35 and 19 would all rotate in unison at three times the speed of the input shaft, with the result that the output shaft 40 would have no rotation. As input speed is increased the control balls 225, force the governor casing towards the control cage such that the control wheels engage on the inner cone of the stationary control element 222, causing them to rotate in the negative sense as shown, with the result that they move forward as they are screwed into the control cage 32A, thereby freeing themselves from the inner cone of the stationary control element 222. The phase shift of command control element 4 being therefore a function of the centrifugal force on the control balls 225 as caused by the input speed. As input speed drops off, reverse rotation of the control wheels takes place as caused by the control wheels coming into contact with the outer cone of the stationary control element 222. When maximum and minimum Periods are being generated by the square-wave generators, the torque pattern is such that the output shaft will rotate in a positive direction when the reversing spool 210 is as shown, and in a negative direction when the reversing spool 210 is moved forward by hydraulic or pneumatic pressure against the reversing piston 220, such that overrunning couplings 137 and 16 are engaged, rather than overrunning couplings 37 and 119.

FIG. 65 shows the simple transmission lay-out of FIG. 45, with double programmed coupling units similar to FIGS. 49 and 50, rather than overrunning couplings, and with inverted gear train Loops 7-8 and 7-8B, reference FIG. 34, affixed to driver take-off gears 35 and 35B, and Loops 7-8A and 7-8C, affixed to driver take-off gears 19 and 19A respectively, with the driven take-off gear 20 and affixed shaft 21 being the input shaft to the transmission, and driven take-off gear 34 and affixed to shaft 33 being the output shaft to the transmission. Uncoupling cam 52, is a four lobed cam with each cam similar to FIG. 57, except that they are profiled to accommodate the Generator Elements of FIG. 2 with the second and fourth cams kinematically reversed from the first and third cam, and the first cam congruent to uncoupling rings 51 and 51B, the second cam congruent to uncoupling rings 51A and 51C, the third cam congruent to uncoupling rings 151 and 151B, and the fourth cam congruent to uncoupling rings 151A and 151C. FIG. 65 shows the inverted gear train Loops 7-8 and 7-8A, with FIG. 66 showing the true relationship of the inverted gear train Loops, together with their respective take-off gear pitch cylinders. Uncoupling cam 52 rotates on the control shaft 1, congruent with command driver gear 22, as held by pin 53, which has passage free to move in the command driver gear. Axial movement of cam 52 is caused by follower 56 and cylindrical cam 57, as the command driver gear is made to rotate by the control mechanism relative to fixed driver gear 3. The total axial movement being L, reference FIG. 57. Items 301 and 303 are keys affixing the single disks 47 and 147, 47A and 147A, 47B and 147B, 47C and 147C, to their respective bevel gears 8, 8A, 8B and 8C. Items 302 and 306 are bearings to respective driven gears 7 and 8, 7A and 8A, 7B and 8B and 7C and 8C. Items 304 and 305 are the rear caps and spacers to Loops 7-8 and 7-8B, and 7-8A and 7-8C respectively. The remaining items are as identified in FIG. 60. The control motor armature and field windings are not shown in FIG. 65. The take-off ratios: gear 20 to gear 19A or 19C is one, and gear 34 to gear 35 or 35B is 2.

With the driver gear Generator Elements at the Inphase Datum the Translation Ratio between the input shaft 21 and output shaft 33 would be +2. With the driver gear Generator Elements such that maximum and minimum Periods of 1.25X and 0.75X the speed of the control shaft 1 are being generated, with axial movement of the uncoupling cams such that the maximum Periods are being coupled to Loops 7-8 and 7-8B, with the minimum Periods being coupled to Loops 7-8A and 7-8C, the Translation Ratio of input to output would be +1.2, or +3.33 when the maximum periods are coupled to Loops 7-8A and 7-8C, and the minimum periods coupled to Loops 7-8 and 7-8B. In follows that the Translation Ratio through the transmission of FIG. 65 is infinitely variable over the range of +1.2X to +3.33X the input velocity.

FIGS. 67 and 68 illustrate a cylindrical hydraulic actuator control mechanism that is angular velocity sensitive. The input shaft or control shaft 1, has affixed to it by key 31 the cylindrical actuator piston control element 2, with appropriate oil passages to each side of the double lobes such that they connect with the spiral grooves on the extended cylinders of the piston actuator. FIG. 68 shows a partially section view, with FIG. 67 showing the section x—x of FIG. 68, with the oil passage holes clearly indicated. Co-axially mounted on shaft 1 and free to rotate is the command driven gear 5, to which is affixed the cylindrical actuator outer body control element 4, with the rear cover plate 60, affixed as shown by screws 61. On the extended cylinder of the rear cover plate 60, are affixed fly-weights 58 as illustrated. Mounted concentrically between the actuator piston and rear cover plate extended cylinder, and free to move axially, is the hydraulic cylinder control valve 59, together with return spring as shown. The flyweights being mounted such that they press against the control valve with both the In and Out oil galleries closed, and the driver Generator Elements at the Inphase Datum at low governor speed. As the speed of rotation increases above low governor speed the flyweights force the control valve 59 against the return spring, such that the In and Out oil galleries are made congruent to their relative spiral groove on the extended cylinder of the actuator piston, with the resulting passage of oil causing a relative rotation of the actuator body about the actuator piston thereby effecting a phase shift between command driver gear 5 and fixed driver gear 3. Rotation of the actuator body is subject to the congruency between the oil galleries and spiral grooves, with the axial movement of the control valve as caused by an increase in rotational speed above the low governor speed, correlated to the rotation of the actuator body about the actuator piston. The above process being reversible as the rotational speed approaches low governor speed.

FIGS. 69, 70, and 71 show approximations of pitch circle profiles of square-wave Generator Elements which illustrate specifically the specification of Cylical Ratio and Cycle Ratio criteria, and are included in this disclosure to eliminate any ambiguity.

FIG. 72 is an isometric, quarter-section view of the simple transmission lay-out of FIG. 46 with an added spicyclic differential amplifier and hardwheel dynamic control mechanism. The input element consists of shaft 1, with fixed driver gear 3 and fixed control element 2, attached by key 31. The movable control element 4, with affixed command driver gear 5 by pin 122, being free to move on shaft 1. The double spool gear with affixed cone wheel 29, mounted in control cage 32A and 32B being congruent to the control elements, with element 4 having one less tooth than element 2, and with the whole assembly free to rotate with the input shaft. The outer static control cone 222A with affixed hardwheel 403, mounted in the rear outer casing 214 such that with rotation as indicated the static outer cone will impinge on the rotating cone wheel of the double spool gear 29, as caused by the congruent left hand thread as shown. Impingement of the outer cone to the rotating cone wheel causes rotation of the double spool gear in the negative sense, which effects a phase shift between the control element 4 and affixed driver gear 5, and the control element 2 and driver gear 3, affixed to the input shaft 1. The hard-wheel and inner static control cone 222B, is mounted on the end outer casing 215 with left hand threads as shown such that with rotation of the hard-wheel as indicated, the inner static cone will impinge on the rotating cone wheel of the double spool gear 29 causing rotation in the opposite sense. Rotation of the spool gear 29 causes a relative phase shift of the driver gear Generator Elements.

Congruent to the fixed driver gear 3 is a bank of fixed driven gears and differential bevel gears 7-8, 7-8A, 7-8B, and 7-8C. Congruent to the command driver gears 5 is a bank of command driver gears and differential bevel gears 9-10, 9-10A, 9-10B and 9-10C, with both banks of bevel gears congruent with the pinions 13 of their respective differential carriers 11, 11A, 11B and 11C, bearing caps 14, tapered retaining rings 114, and counter shafts 12, 12A, 12B and 12C. The counter shafts extend through the rear and center inner casing 411 and 410 to the torque transmitting bank of driver take-off gears 19, 19A, 19B and 19C, together with their overrunning couplings 16, to the torque accepting bank of driver take-off gears 35, 35A, 35B and 35C with their overrunning couplings 37, to the forward inner casing 409. Congruent to the torque transmitting take-off gears is the common take-off gear 20 and affixed splined shaft 21, which splines to the epicyclic differential amplifier cage 40, and carries epicyclic pinions 41. Congruent to the torque accepting driver take-off gears is the common driven take-off gear 34 which is affixed to the extended shaft of the epicyclic ring gear 39, by the key 407. The output shaft 44 being affixed to the spur gear of the epicyclic differential amplifier 43 by the key 406, and mounted in the end cap of the inner casing 408. Item 405 is an overrunning coupling unit and bearing, so oriented that it accepts the counter torque on the inner casing assembly when kinematic Translation of input dynamics is greater than +1, and free-wheels when kinematic Translation is +1. Item 404 is an overrunning coupling unit and bearing, so oriented that it accepts torque from the inner casing assembly when kinematic Translation of input dynamics tends to be less than +1, thus preventing actual kinematic Translation of input dynamics less than +1. Items 401 and 402 are flat spiral return springs which hold the control hard-wheels in their disengaged position. Item 213 is the stationary outer casing to which is affixed the rear outer casing 214, and end outer casing 215. The take-off gear ratios and epicyclic ratio are such that the Translation Ratio of input dynamics, shaft 1, to the output element shaft 44, varies from infinity to +1.

With the Translation Ratio of input dynamics on shaft 1 to the output shaft 44, between infinity and less than +1, counter torque on the output shaft would be transferred from the inner casing assembly to the stationary outer casing, through the overrunning coupling and bearing 405, and accordingly both would remain stationary. With the kinematic Translation Ratio of input dynamics at +1, the inner casing assembly would free-wheel, and be prevented from exceeding the Translation Ratio of +1, by the overrunning coupling 404. With the inner casing free-wheeling at the same rotational velocity as the input shaft, there would be no relative rotation of the transmission drive train elements and mechanical efficiency would tend towards 100%.

FIG. 73 shows a complex simple transmission lay-out with the generator elements of FIG. 2 and kinematics as shown in FIG. 59, Graph (A) and Graph (D) such that only one countershaft is required to maintain kinematic continuum through the transmission. To the input shaft 1 are affixed two fixed driver gears 3 and 3A, with their respective major radius 180° apart, together with a fixed double gear control element 2. Command driver gear 22 with affixed movable control element 24 and key 31, is such that congruent driven gear 25 with integral overrunning coupling 27 are mounted to differential bevel gear 10. A second command driver gear 5, and congruent driven gear 9 with integral overrunning coupling 16 also mounted to differential bevel gear 10. Affixed to driver gear 5 is a second command driver gear 5A with major radius 180° opposite and congruent driven gear 9A with integral overrunning coupling 16 mounted to differential bevel gear 64, with movable control element 4 and key 30, also affixed as shown, with a second command driver gear 22A and congruent command driven gear 25A with integral overrunning coupling 27 also mounted on differential bevel gear 64, and also affixed to it movable control element 24A by key 122. A three spool gear 29A, with the spools respectively congruent to control elements 24 and 24A, and the first gear of control element 2, together with a two spool gear 29, with the spools respectively congruent to control element 4 and the second gear of control element 2, mounted and free to move with control cage 32 and attached compounding element 6. Control elements 24, 24A and 4 have half the number of teeth than the total teeth on both gears of the double gear control element 2, with one gear of the double gear having two more teeth than the other, such that for every rotation of the cage about the control element 2, control elements 24 and 24A will rotate the subtended angle of one of their teeth in either a positive or negative sense, with control element 4 rotating the same amount respectively in either a negative or positive sense. Counter shaft 12, has affixed to it differential carrier 11 together with double pinions 62 and 13, bearing caps 14 and retaining cone 114, and driver take-off gear 19. Item 20 and 21 are respectively the driven take-off gear and output shaft to the transmission.

With the driver generator elements at the In-phase condition as shown, rotation of the differential carrier and attached counter shaft will remain constant at the same velocity of the input shaft with the relative kinematics of the transmission drive elements as shown in Graph (A) of FIG. 59. Accordingly, the driven take-off gear and attached output shaft would rotate 1X the speed of the input shaft, with the kinematic continuum through the transmission being shared equally by all square-wave generator elements of the complex simple lay-out.

With the respective command driver gears rotated +90° from their Inphase condition the kinematics of each of the simple square-wave generators would be as shown in Graph (D) to FIG. 59 and such that their respective kinematic patterns are 180° out of phase with each other. Kinematic continuum through the transmission would be felt continuously on the differential carrier, counter shaft, driver and driven take-off gears, with the continuum assigned to each of the respective pinions, bevel gears and attached driven and driver generator elements of the separate square-wave generators for 180° rotation of the common input shaft and control mechanism. Accordingly the driven take-off gear and affixed output shaft would rotate 1.25X the speed of the input shaft.

The embodiments of the invention in which an exclusive property of privilege is claimed are defined as follows:

1. An inverted-gear-train-loop with the first gear-element of said loop consisting of identical driver-gears of two sets of variable-ratio-gears with said sets incorporating the embodiments as specified for square-wave-generator elements:

| | | |
|---|---|---|
| Driven Gear | $\frac{x+y}{x}$ | $\frac{\text{Teeth}}{\text{Voids}}$ |
| Driver Gear | $\frac{x}{x+y}$ | $\frac{\text{Teeth}}{\text{Voids}}$ |
| A/B Ratio | between 1 and 4 | |
| Asymmetry Ratio | between .5 and .95 | |
| Bias Ratio | between −.2 and +.2 | |
| Cyclical Ratio | between 1/10 and 10 | |
| Cycle Ratio | between 1/10 and 10/1 | | with one of said driver-gears affixed to a first shaft together with a common-spur-gear control-element, with the second driver-gear affixed to a tubular shaft together with a second identical common-spur-gear control-element, with said tubular shaft concentrically mounted between the one driver-gear and control-element of said first shaft; concentrically mounted and free to rotate on said first shaft adjacent to said control-element is a control cage incorporating a plurality of double-spool gear-elements with one spool having one less tooth than the other, with said spool with one less tooth congruent to said one control-element affixed to said first shaft, and with said spools with one more tooth congruent to said control-element affixed to said tubular shaft, so that, when said control cage is rotated with said tubular shaft held relatively fixed, said first control-element together with said first shaft and said one driver-gear will be caused to rotate relative to said second driver gear affixed to said tubular shaft; with the second gear-element of said inverted-gear-train-loop consisting of identical driven-gears of said two sets of variable-ratio-gears, to which are affixed the bevel gears of a differential-gear-train, said differential-gear-train also having a carrier and at least one pinion, with the carrier and pinions of said differential-gear-train affixed to a third shaft with an end thereof extended to form the inner race of an overrunning clutch, with the outer race of said overrunning clutch together with the third spur-gear-element of said inverted-gear-train-loop affixed to a fourth shaft co-axially mounted with said third shaft; and congruent to said third spur-gear-element is the last spur-gear-element of said inverted-gear-train-loop, to which is affixed a fifth shaft co-axially mounted with said first shaft.

2. An inverted-gear-train-loop as defined in claim 1, wherein said overrunning clutch is repositioned, with said inner race affixed to said bevel gear of said differential-gear-train with said driven variable-ratio-gear congruent to said driver-gear affixed to said first shaft, and with said outer race affixed to said drive gear; with said second shaft extended and affixed directly to said third spur-gear-element of said inverted-gear-train-loop with the third shaft of said loop eliminated.

3. An inverted gear-train-loop as defined in claim 1, wherein said overrunning clutch is repositioned, with said inner race affixed to said bevel gear of said differential-gear-train with said driven-variable-ratio-gear congruent to said driver-gear affixed to said first shaft, and with said outer race affixed to said driven-gear; with said second shaft extended and affixed directly to the third spur-gear-element of said inverted-gear-train-loop with said third shaft of said loop eliminated, and with a third identical set of variable-ratio-gears incorporated in said loop so that the driver-gear of said third set is affixed together with a third identical common-spur-gear control-element to a second tubular shaft concentrically mounted and free to rotate between said first tubular shaft and said first shaft between said one driver-gear and said first control-element, with said plurality of double-spool gear-elements incorporated in said control cage having a third spool with one more tooth than said second spool and congruent to said third control-element, so that, when said control cage is rotated with said first tubular shaft held fixed, said second tubular shaft will be caused to rotate in the opposite sense, with the same order, as the first shaft; with the driven-gear of said third set of identical variable-ratio-gears affixed to the outer race of a second overrunning clutch, with the inner race affixed to said bevel gear of said differential-gear-train extended to form the inner race of said second overrunning clutch.

* * * * *